US012789548B2

(12) United States Patent
Jolani

(10) Patent No.: US 12,789,548 B2
(45) Date of Patent: Nov. 10, 2026

(54) ONE-PIECE-SINGLE-UNIT DEVICE OF COMBINED VERTICAL SCOOP-FUNNEL-DISPOSABLE CUP CONTAINER MATE COMPONENT

(71) Applicant: Hossein Jolani, O'Fallon, IL (US)

(72) Inventor: Hossein Jolani, O'Fallon, IL (US)

( * ) Notice: Subject to any disclaimer, the term of this patent is extended or adjusted under 35 U.S.C. 154(b) by 0 days.

(21) Appl. No.: 18/665,873

(22) Filed: May 16, 2024

(65) Prior Publication Data

US 2024/0300261 A1 Sep. 12, 2024

Related U.S. Application Data

(63) Continuation-in-part of application No. 17/803,219, filed on Mar. 18, 2022, now abandoned.

(51) Int. Cl.
*B44D 3/22* (2006.01)
*B05C 17/12* (2006.01)
*B44D 3/12* (2006.01)

(52) U.S. Cl.
CPC ................ *B44D 3/22* (2013.01); *B05C 17/12* (2013.01); *B44D 3/12* (2013.01)

(58) Field of Classification Search
CPC B05C 5/00; B05C 11/11; B05C 17/12; B44D 3/12; B44D 3/22
See application file for complete search history.

(56) References Cited

U.S. PATENT DOCUMENTS

| | | | | | | |
|---|---|---|---|---|---|---|
| 149,887 | A | * | 4/1874 | Sawyer | A47G 19/02 | 220/555 |
| 277,140 | A | * | 5/1883 | Lane | B65D 85/80 | 220/756 |
| 329,467 | A | * | 11/1885 | Manley | A47J 36/08 | 210/466 |
| 1,298,031 | A | * | 3/1919 | Fromhagen | B65D 25/48 | 222/569 |
| 1,732,130 | A | * | 10/1929 | Lindahl | B67C 11/02 | 222/569 |
| 2,030,975 | A | * | 2/1936 | Fairchild | G01F 19/00 | 73/426 |
| 2,200,642 | A | * | 5/1940 | Shell | B67C 11/02 | 222/51 |
| 2,849,158 | A | * | 8/1958 | Hopla | B65D 25/48 | 222/569 |
| 3,596,813 | A | * | 8/1971 | Munn | B65D 47/12 | 222/439 |
| 3,987,943 | A | * | 10/1976 | Richmond, Jr. | B65D 25/48 | 222/570 |
| 4,230,238 | A | * | 10/1980 | Wilson | G01F 19/00 | 99/348 |
| D267,357 | S | * | 12/1982 | Hillstrom | D32/46 | |

(Continued)

*Primary Examiner* — Paul R Durand
*Assistant Examiner* — Randall A Gruby
(74) *Attorney, Agent, or Firm* — Sandberg Phoenix & von Gontard, P.C.

(57) ABSTRACT

A one-piece-single-unit device comprising a portrait and landscape painting tool for a method of directly flowing liquid paint material with precision on a canvas with a disposable cup. The device includes a plurality of connected vertical sections comprising: 1) container section having a handle; 2) a funnel section having a bowl shape and a narrow opening end connected to a tube; 3) a tube section; 4) a scoop section; and 5) a flat section.

3 Claims, 16 Drawing Sheets

(56) References Cited

U.S. PATENT DOCUMENTS

| | | | | | |
|---|---|---|---|---|---|
| 4,893,723 | A * | 1/1990 | Seabolt | B44D 3/12 220/570 |
| 5,054,661 | A * | 10/1991 | Hollje | B44D 3/12 220/570 |
| 5,078,872 | A * | 1/1992 | Durant | B01D 29/085 222/569 |
| 5,392,969 | A * | 2/1995 | Usery | B65D 25/48 222/570 |
| 5,505,347 | A * | 4/1996 | Roma | B65D 25/48 222/573 |
| 5,645,191 | A * | 7/1997 | Neville | B65D 47/0809 220/717 |
| 6,419,106 | B1 * | 7/2002 | Bebak | B44D 3/121 220/570 |
| 6,427,879 | B1 * | 8/2002 | Caldwell | G01F 19/00 222/572 |
| D472,684 | S * | 4/2003 | Bebak | D32/53.1 |
| D518,264 | S * | 3/2006 | Renzello | D32/53.1 |
| 7,467,728 | B2 * | 12/2008 | Lundy | B44D 3/12 220/629 |
| 9,538,823 | B2 * | 1/2017 | Hayes | A45D 19/06 |
| 9,950,839 | B2 * | 4/2018 | Adams | B65D 25/48 |
| 9,963,336 | B2 * | 5/2018 | Degraaf, III | B65D 25/48 |
| 10,494,145 | B2 * | 12/2019 | Hudson | B65D 3/12 |

* cited by examiner 1
2
2A
2B
2C
2D
2E
2F
2H
3
3B
3C
3F
4
4B
4C
4Z
6B
7
7A
7B
7F
7Q
7S
7V
7Z
8
8E
9
9A
9J
10A
14A
15A
X2

ONE-PIECE-SINGLE-UNIT DEVICE OF COMBINED VERTICAL SCOOP-FUNNEL-DISPOSABLE CUP CONTAINER MATE COMPONENT

CROSS-REFERENCE TO RELATED APPLICATIONS

This application is a Continuation-in-Part Application of U.S. application Ser. No. 17/803,219 filed Mar. 18, 2022, the content of which (text, drawings, and claims) is incorporated herein by reference.

TECHNICAL FIELD

The present description relates to the flowable material, particularly liquid, with a disposable cup used for pouring function. More specifically, the present description relates to a pouring artist using a disposable cup for pouring liquid paint on a canvas or any surface.

BACKGROUND

Most pouring artists use a disposable cup with a liquid paint that has been adjusted to the artist's desired consistency using water or other liquid medium materials. The artist then pours the liquid paint which is inside the disposable cup onto the canvas or any other desired surface, but if the canvas has drawn pictures or figures and so on, pouring with disposable cup does not work well, because the artist has less detail or precision control, if any, on the amount of paint that flows from the disposable cup. The artist also has less choice of style, pattern, texture or design in pouring of liquid paint from the disposable cup on to the canvas, which is extremely limited in the pouring process by the pouring artist. It also a takes lesser angle level for the direct use of a disposable cup for the pouring process and that means a lesser control angle by the artist or any other users.

BRIEF SUMMARY

The primary objectives are as follows. The first objective is to give the pouring artist more control on quantity and quality of detail of pouring and a more precise pouring along with a more creative variety of patterns, textures, designs and styles in the world of paint pouring art. The second objective is for the present device to be used directly with a flowable material, particularly liquid paint. The present device can be washed and used over and over and also can be used indirectly with a disposable cup for this pouring function. The third objective is to give the pouring artist options to manipulate mix-paint from the time liquid paint travels from the cup section to the scoop section. This is where the unique styles, textures, designs, and patterns of each artists pouring will be born and created The fourth objective is to have the scoop section embodied with a straight line, curve, or even angular pointed tip along with a variety of patterns, shapes and designs which create a variety of textures.

In the following description, the term vertical refers to an upright position and the term horizontal refers to a straight and level position.

BRIEF DESCRIPTION OF THE DRAWINGS

The accompanying drawings, which are incorporated in and constitute a part of the specification, illustrated embodiments of the invention and together with the description and serve to explain the principle of the invention.

DETAILED DESCRIPTION

Figure 1:
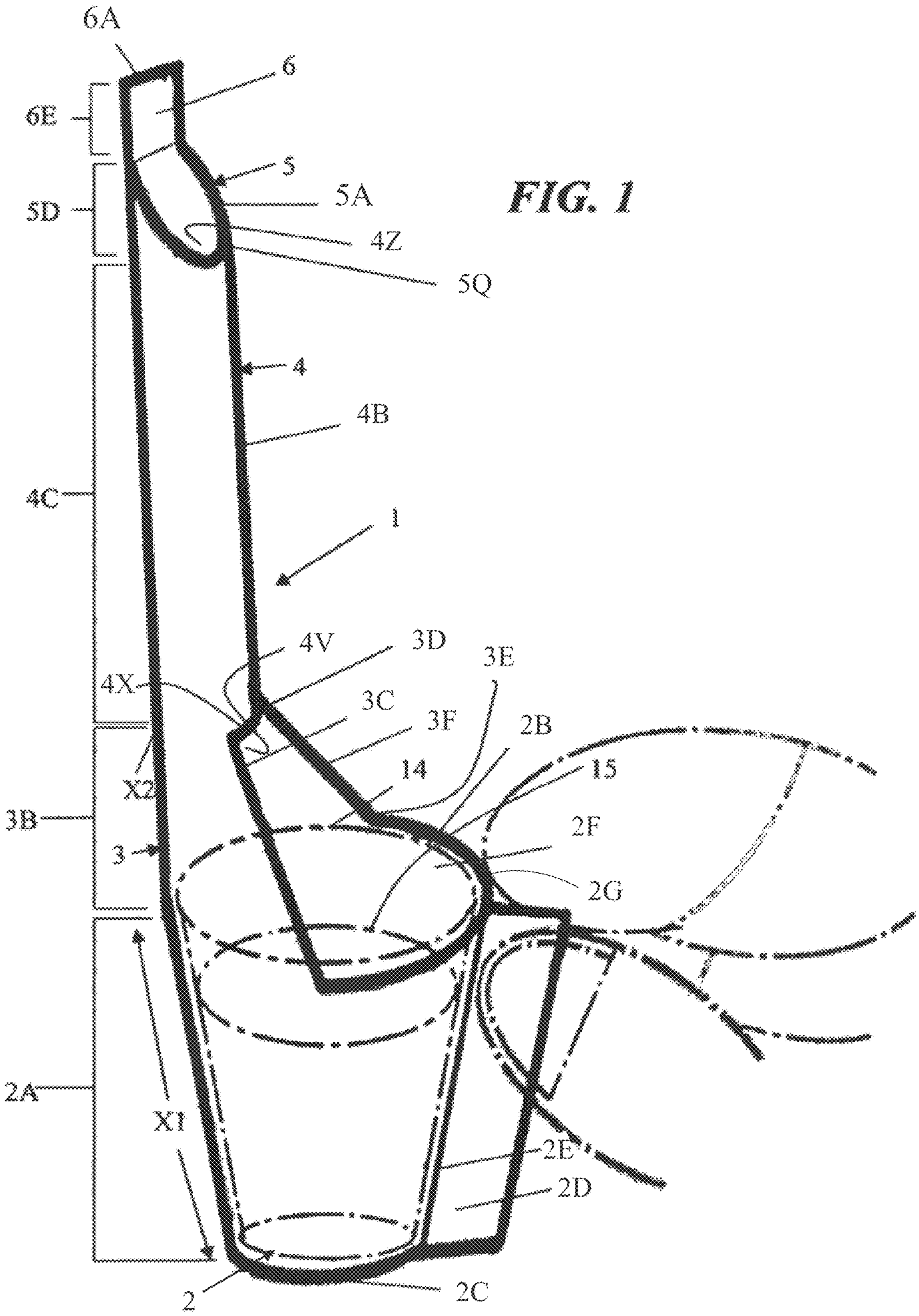
FIG. 1 is a perspective view of a one-piece-single-unit device of a combined vertical scoop-funnel-disposable cup container mate component, in accordance with an embodiment of the present invention.

FIG. 1 shows a device 1 which is used for pouring liquid material 15 from a standard cup 14. In at least one case, the liquid material 15 is liquid paint.

FIG. 1 shows the device 1, which is made of five vertically extended and connected components which are as follows: a container section 2A, a funnel section 3B which is vertical and semi-cone-shaped, a tube section 4C, a vertical top adjacent scoop section 5D which comprises a scoop 5 and a flat section 6E which has a straight edge 6A, which is all comprised in a single piece in the device 1. The first combined section is the container section 2A which is made with a hollow tube 2G. The hollow tube 2G comprises a top opening 2F sized and disposed such that the standard cup 14 with liquid material 15 can be placed inside the hollow tube 2G. The vertical cup container 2 has an opening edge 2B at the edge of the top opening 2F. The vertical cup container 2 also has a bottom edge 2C that is ring-shaped and narrower than the opening edge 2B. The container section 2A also has a handle 2D which is of an extended and connected off-vertical flat parallelogram shape, and which starts from the opening edge 2B and extends to the bottom edge 2C. The container section 2A is connected to a funnel 3, which is vertical and semi-cone shaped, in the funnel section 3B. The funnel section 3B is made with a deep bowl shape and a first inclined edge 3C and a second inclined edge 3F, and comprises a narrow opening end 3D which is joined to a tube 4 of the tube section 4C. The narrow opening end 3D defines a funnel bottom opening 4X. The funnel section 3B functions as a transition area for flow of the liquid material 15 between the container section 2A and the tube 4, and thus the funnel section 3B is connected to the tube section 4C. The third combined section which is the tube section 4C comprises the tube 4 which has a ring-shaped circumference, a tube top opening 4Z, and a tube bottom opening 4V. The tube bottom opening 4V is defined by the narrow opening end 3D, and the tube top opening 4*z* is defined by a scoop edge 5A of the scoop section 5D. The tube 4 allows travel and manipulation of the liquid material 15 which can vary by changes in the length and internal surface shape of the tube 4. The scoop section 5D adjoins the flat section 6E which comprises a flat square 6 and the straight edge 6A at the edge of the flat square 6 The scoop edge 5A is an angle-cut semi-elliptical edge that defines the tube top opening 4Z which allows flowing liquid material to be seen before it gets to the flat square 6 of the flat section 6E that is an important area in liquid paint material for a paint pouring artist. The flat section 6E which has the straight edge 6A, is a main integral section of this whole invention, as by changing the shapes, patterns, designs and styles of the straight edge 6A of the flat square 6 the result of pouring flowable materials will change accordingly.

Figure 2:
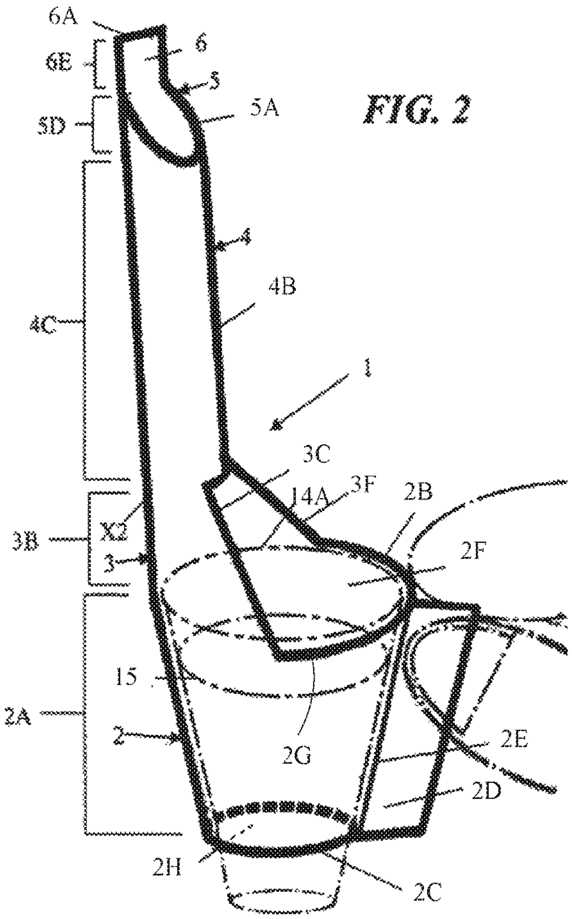
FIG. 2 is a perspective view of a one-piece-single-unit device of combined vertical scoop-funnel-disposable cup container mate component with an open-end cup container mate section, in accordance with an embodiment of the present invention.

The following figures show embodiments of the device 1 that are variations of the embodiment presented with respect to FIG. 1. FIG. 2 similar to FIG. 1 shows the device 1 which is made of five vertically extended and connected components as follows; the container section 2A, the funnel section 3B, the tube section 4C, the scoop section 5D, and the flat section 6E which has the straight edge 6A. Section 2A comprises the hollow tube 2G and the annular side wall 2E and further comprises the bottom edge 2C which comprises a bottom opening 2H. Modifying the bottom edge 2C with the bottom opening 2H allows a longer cup 14A, which is longer than the standard cup 14 and thus more of the liquid material 15.

Figure 3:
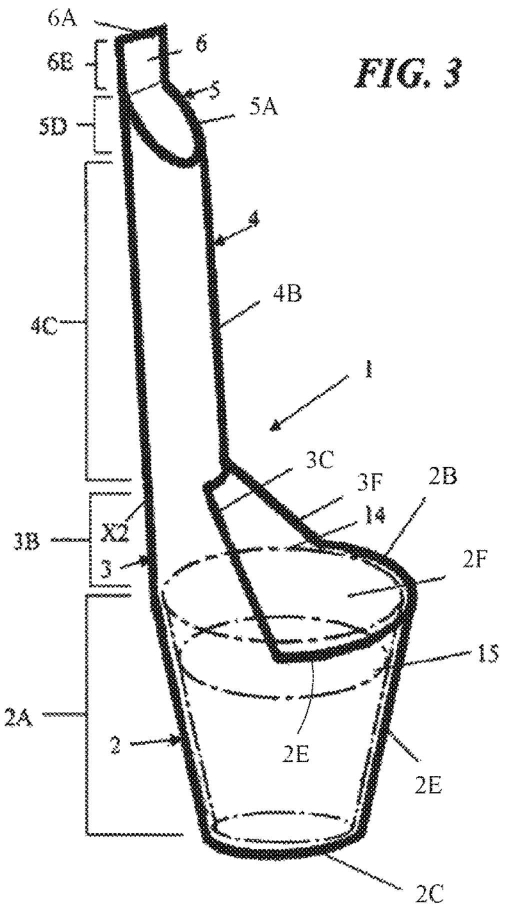
FIG. 3 is a perspective view of a one-piece-single-unit device of combined vertical scoop-funnel-disposable cup container mate component with a cup container mate section without a handle, in accordance with an embodiment of the present invention.

FIG. 3 is similar to FIG. 1 but shows an embodiment of the device 1 without the handle 2D.

Figures 4, 5, 6:
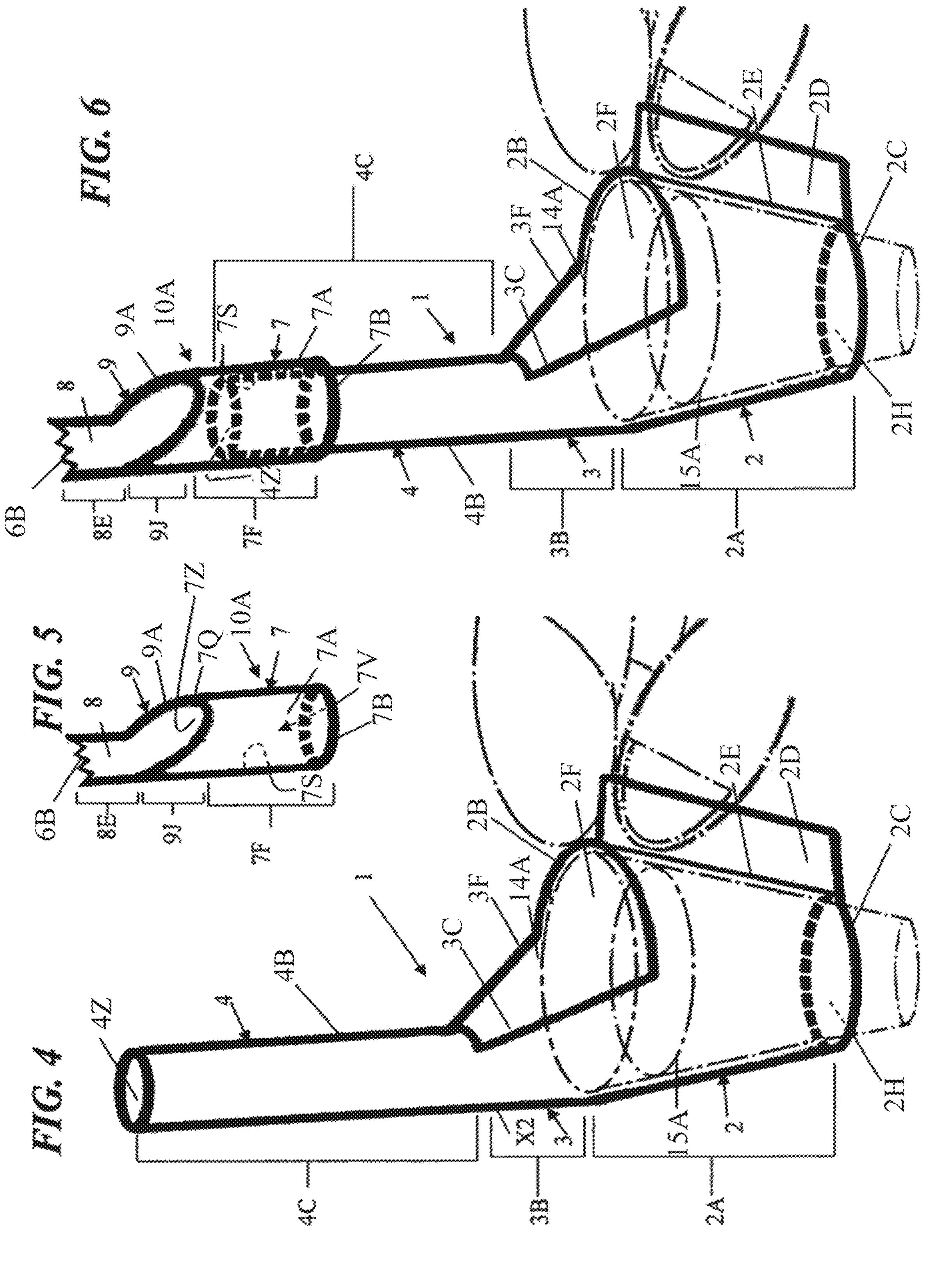
FIG. 4 is a perspective view of a one-piece-single-unit device of combined vertical scoop-funnel-disposable cup container mate component without top second adjacent scoop along with an extended flat square surface section which has a top end straight line edge section and an open-end cup container mate section, in accordance with an embodiment of the present invention.
FIG. 5 is a perspective view of an attachable second scoop funnel head along with an extended flat square surface section which has a straight series of a connected top end evenly spaced and sized beveled edge section, in accordance with an embodiment of the present invention.
FIG. 6 is a perspective view of a one-piece-single-unit device of combined with a vertical scoop-funnel-disposable cup container mate component with an open-end cup container mate section and a connected by an attachable second scoop funnel head which has a straight series of a connected top end evenly spaced and sized beveled edge section, in accordance with an embodiment of the present invention.

FIG. 4 is similar to FIG. 1 but shows an embodiment of the device 1. The funnel top opening 4Z of the tube section 4C is not vertically and integrally connected to the scoop section 5D a. In the embodiment of device 1 shown in FIG. 4, the scoop section 5D and the flat section 6E have been removed.

FIG. 5 shows a scoop funnel head 10A, which is attachable to the device 1, and which is made up of a secondary funnel section 7F comprising a secondary funnel 7, which is generally cylindrical, with a secondary wall 7A that is generally annular. The secondary funnel 7 comprises a secondary top opening 7Z of and a secondary bottom opening 7V. The secondary funnel also comprises a secondary scoop 9 and a secondary wall 7A integrated with a secondary scoop section 9J. Connected to the scoop section 9J is a flat section 8E, which has a flat end 8 and a beveled edge 6B.

FIG. 4 and FIG. 5 can be combined together which is shown in FIG. 6 by showing the tube section 4C is coupled and disposed within the scoop funnel head 10A. The tube 4 and scoop funnel head 10Are supported by the body wall 4B and the secondary wall 7A during the coupling function by having no gap between the body wall 4B of the tube 4 and the inner surface body 7S of the scoop funnel head 10A.

Figure 7:
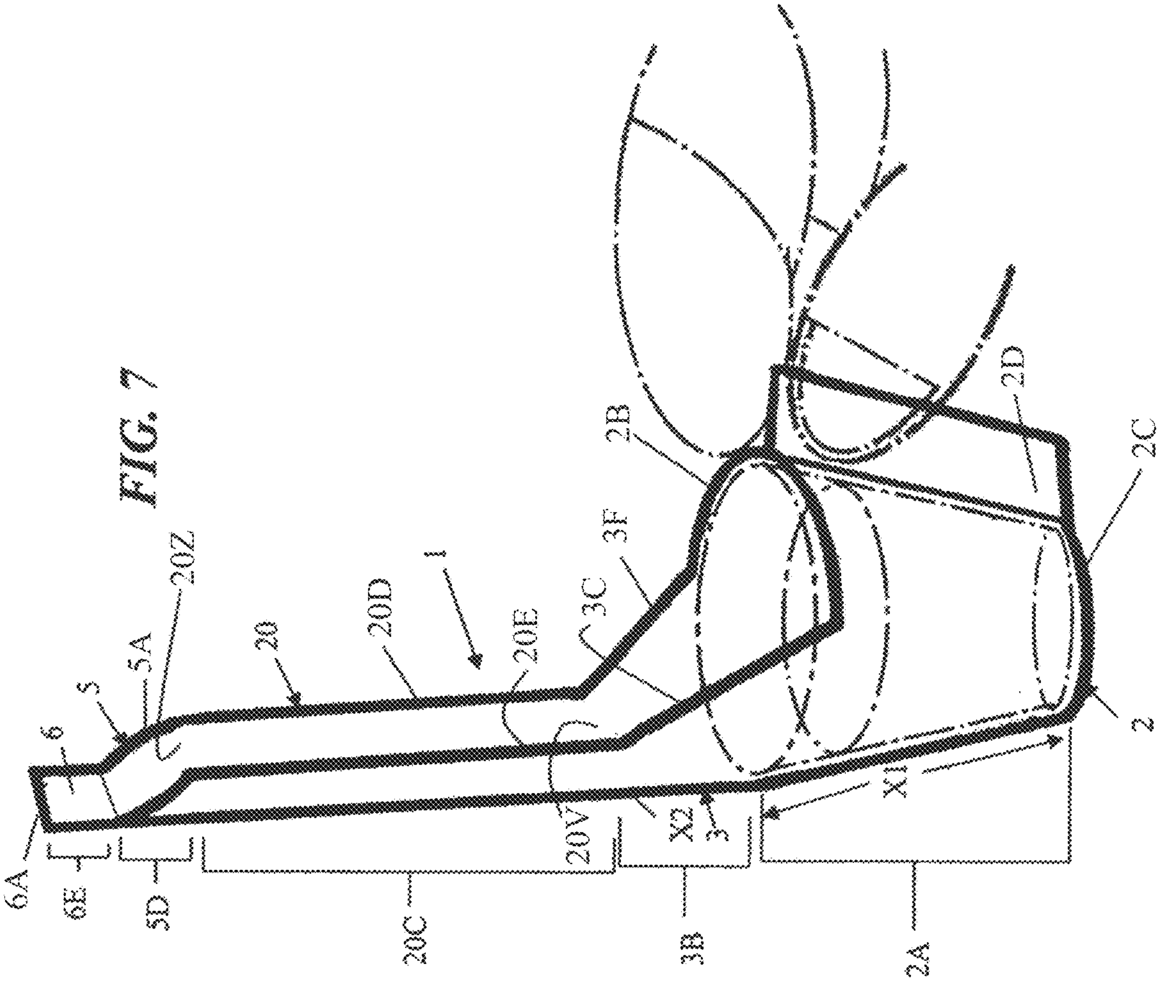
FIG. 7 is a perspective view of a one-piece-single-unit device of a combined vertical scoop-funnel-disposable cup container mate component with a semi-cylindrical funnel, in accordance with an embodiment of the present invention.

FIG. 7 is similar to FIG. 1 but shows an embodiment of the device 1 wherein the tube section 4C is replaced with a semi-cylindrical section 20C. The semi-cylindrical section 20C comprises a semi-cylindrical tube 20. The semi-cylindrical tube 20 comprises a substantially annular body wall 20D connected to the scoop edge 5A of the scoop 5, a first semi-annular opening 20Z and a second semi-annular opening 20V. A conoidal back wall X2 is defined by the semi-cylindrical tube. The container section 2A comprises a cup container wall X1.

Figure 8:
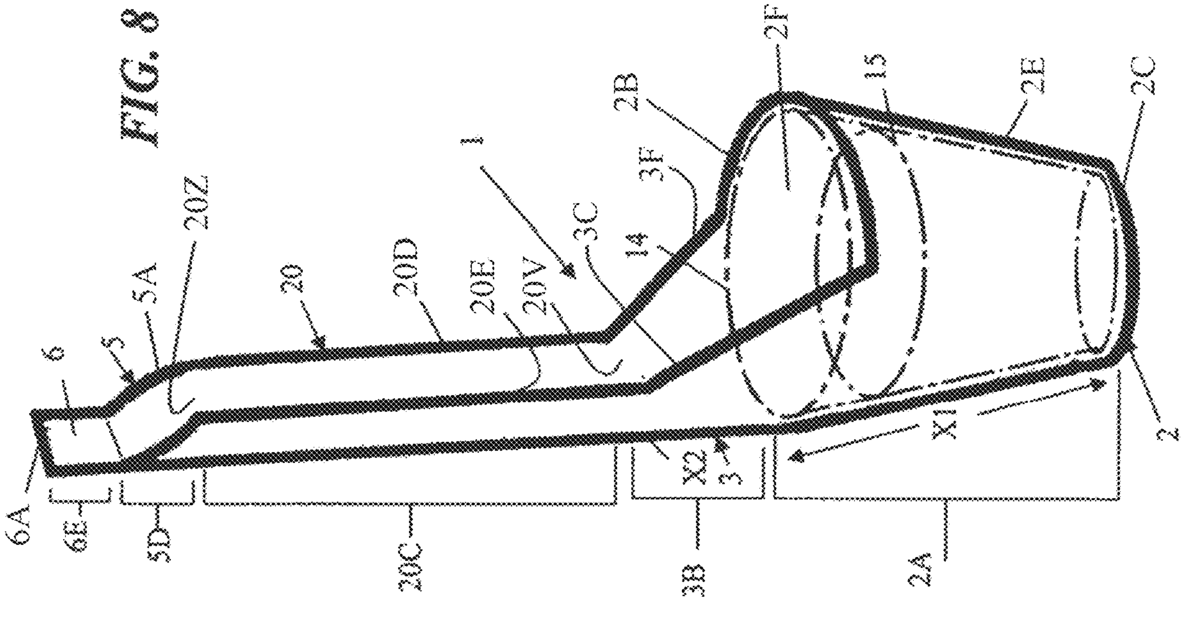
FIG. 8 is a perspective view of a one-piece-single-unit device of a combined vertical scoop-funnel-disposable cup container mate component with a semi-cylindrical funnel, and with the cup container mate section without a handle, in accordance with an embodiment of the present invention.

FIG. 8 is similar to FIG. 7 but shows an embodiment of the device 1 which comprises the section 20C, but the embodiment of device 1 shown in FIG. 8 does not comprise the handle 2D which is shown in FIG. 7.

Figure 9:
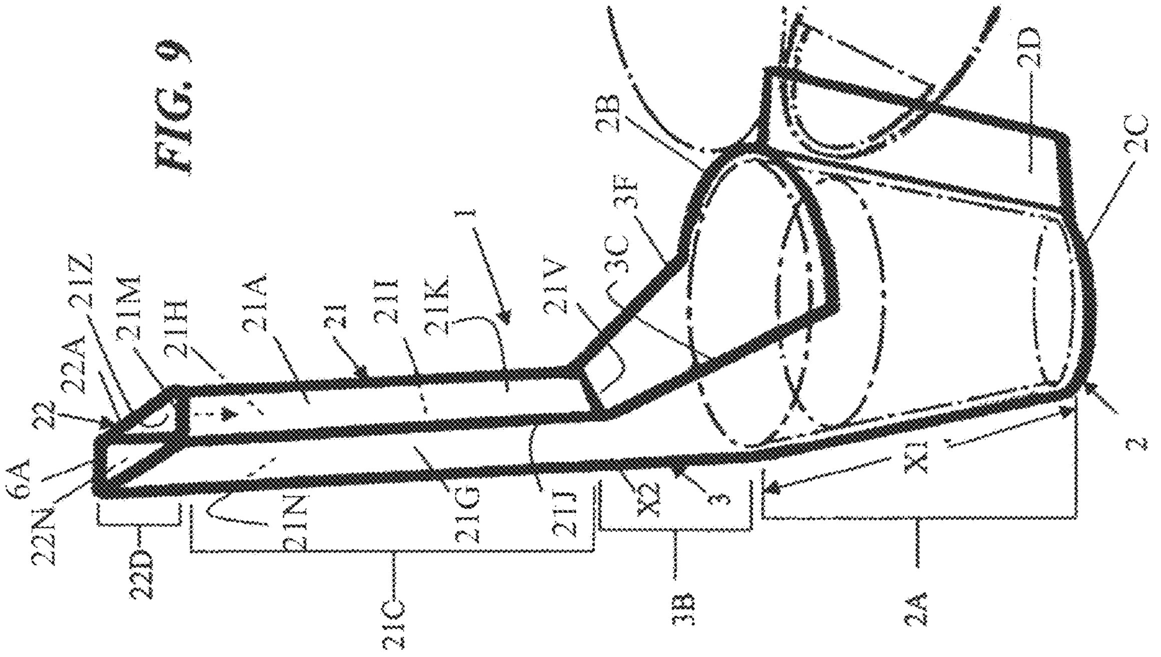
FIG. 9 is a perspective view of a one-piece-single-unit device of a combined vertical scoop-funnel-disposable cup container mate component with a rectangular-prism shaped funnel with a top end rectangular-prism angle cut scoop which has a top end straight line edge section, in accordance with an embodiment of the present invention.

FIG. 9 is similar to FIG. 1 and shows an embodiment of the device 1. except section 4C and scoop section 5D are replaced with a prism shaped funnel section 21C and a rectangular scoop section 22D, respectively, while the flat section 6E does not appear in the embodiment of FIG. 9 at all. The prism shaped funnel section 21C comprises a rectangular prism shaped tube 21 which defines a hollow space 21M. The rectangular prism shaped tube 21 has a first prism side wall 21A, a second prism side wall 21H, a third prism side wall 21G, and a fourth prism side wall 21N. The first prism side wall 21And the second prism side wall 21H are minor and opposite one another, while the third prism side wall 21G and the fourth prism side wall 21N are opposite one another. A rectangular top opening 21Z of the rectangular prism shaped tube 21 is opposite a bottom opening 21V. Both the top opening 21Z and the bottom opening 21V are unobstructed exit openings. The rectangular prism shaped tube 21 is integrally connected to the rectangular scoop section 22D. The rectangular scoop section 22D has a rectangular adjacent scoop that terminates in the straight edge 6A. The fourth prism side wall defines the back interior surface 22N.

Figure 10:
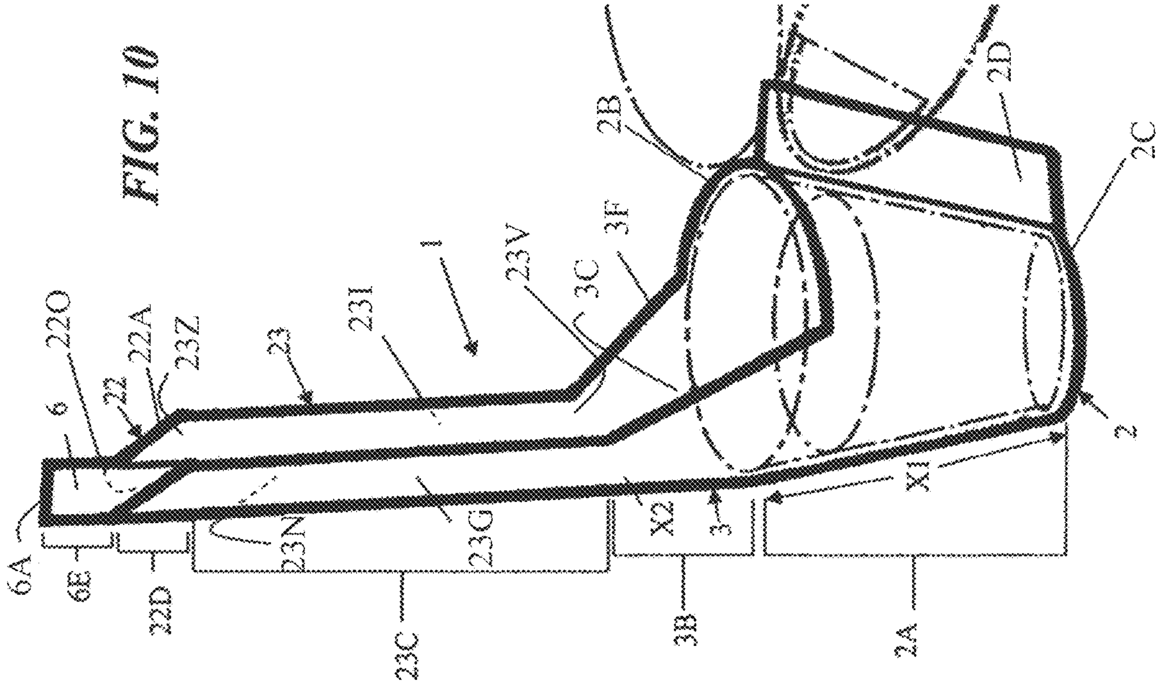
FIG. 10 is a perspective view of a one-piece-single-unit device of a combined vertical scoop-funnel-disposable cup container mate component with a vertical staple shape funnel with the top end staple shape angle cut adjacent scoop along with an extended top end flat square section which has a top end straight line edge section, in accordance with an embodiment of the present invention.

FIG. 10 is similar to FIG. 1 and shows the device 1 except the tube section 4C and the scoop section 5D are replaced by a u-shaped funnel section 23C and the rectangular scoop section 22D, respectively. The u-shaped funnel section 23C comprises a u-shaped funnel 23, wherein the u-shaped funnel 23 comprises three side walls: a first u-wall 23G, a second u-wall 231, and a third u-wall 23N. The first u-wall 23G and the second u-wall 231 are mutually opposed and each is connected to the third u-wall 23N. The u-shaped funnel 23 defines two unobstructed exit openings: a u-shaped bottom opening 23V and a u-shaped top opening 23Z. The third u-wall 23N defines the rear staple surface 22O.

Figure 11:
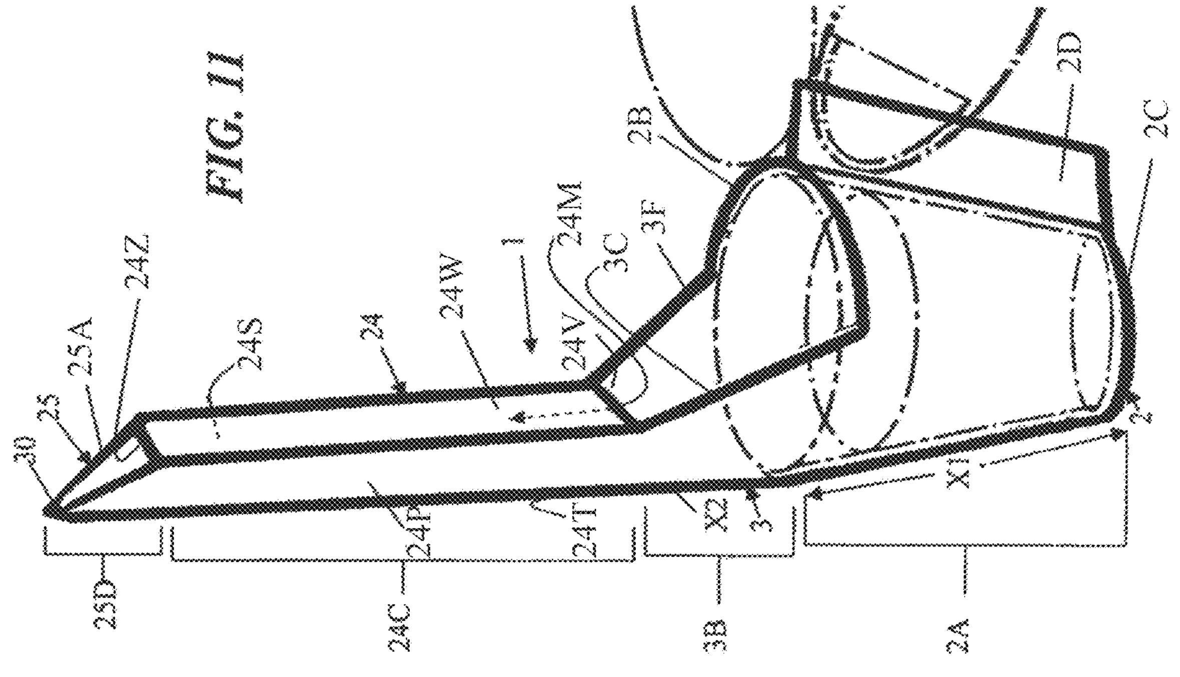
FIG. 11 is a perspective view of a one-piece-single-unit device of a combined vertical scoop-funnel-disposable cup container mate component with a triangular-prism shaped funnel with a top end triangular-prism angle cut adjacent scoop which has a top end V shape pointed tip section, in accordance with an embodiment of the present invention.

FIG. 11 is similar to FIG. 1 and shows the device 1 except that the tube section 4C and the scoop section 5D flat have been replaced with a triangular prism shaped section 24C and a v-scoop section 25D, respectively. Furthermore, section 6E which is shown in FIG. 1, is not present in the embodiment of FIG. 11. The triangular prism shaped section 24C comprises a triangular prism shaped tube 24 which defines a triangular hollow space 24M bordered by three rectangular side walls: a first triangular wall 24P, a second triangular wall 24S, and a third triangular wall 24W. The third triangular wall 24W faces the handle 2D and a triangular edge 24T faces away from the handle 2D. The triangular prism shaped tube 24 defines two unobstructed exit openings: a triangular bottom opening 24V and a triangular top opening 24Z. The v-scoop section 25D has a pointed tip 30.

Figure 12:
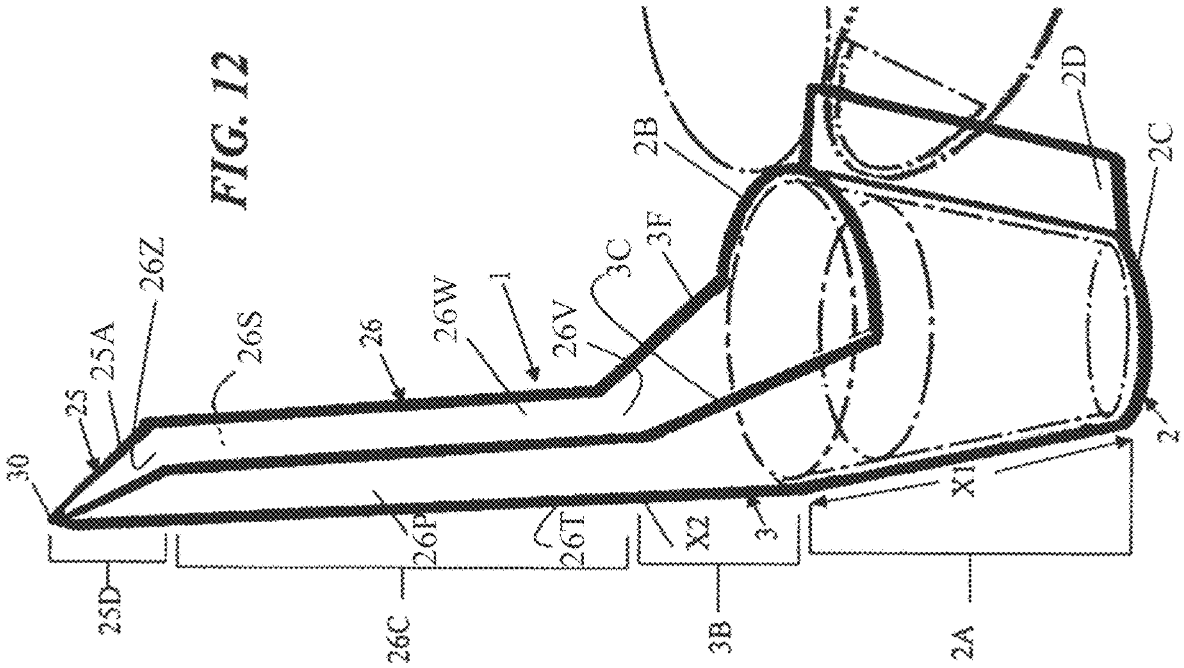
FIG. 12 is a perspective view of a one-piece-single-unit device of a combined vertical scoop-funnel-disposable cup container mate component with a V shaped funnel with a top end V shaped angle cut adjacent scoop which has a top end V shape pointed tip section, in accordance with an embodiment of the present invention.

FIG. 12 is similar to FIG. 11 and shows an embodiment of the device 1 wherein the triangular prism shaped section 24C of the embodiment of FIG. 11 is replaced with a v-shaped section 26C. The v-shaped section 26C comprises a v-shaped funnel 26, which has two rectangular side walls: a first v-shaped funnel wall 26P and a second v- shaped funnel wall 26S. The v-shaped funnel 26 defines a v-shaped bottom opening 26V and a v-shaped top opening 26Z. The v-scoop section 25D, which has a V shape and a pointed tip 30, adjoins the v-shaped section.

Figure 13:
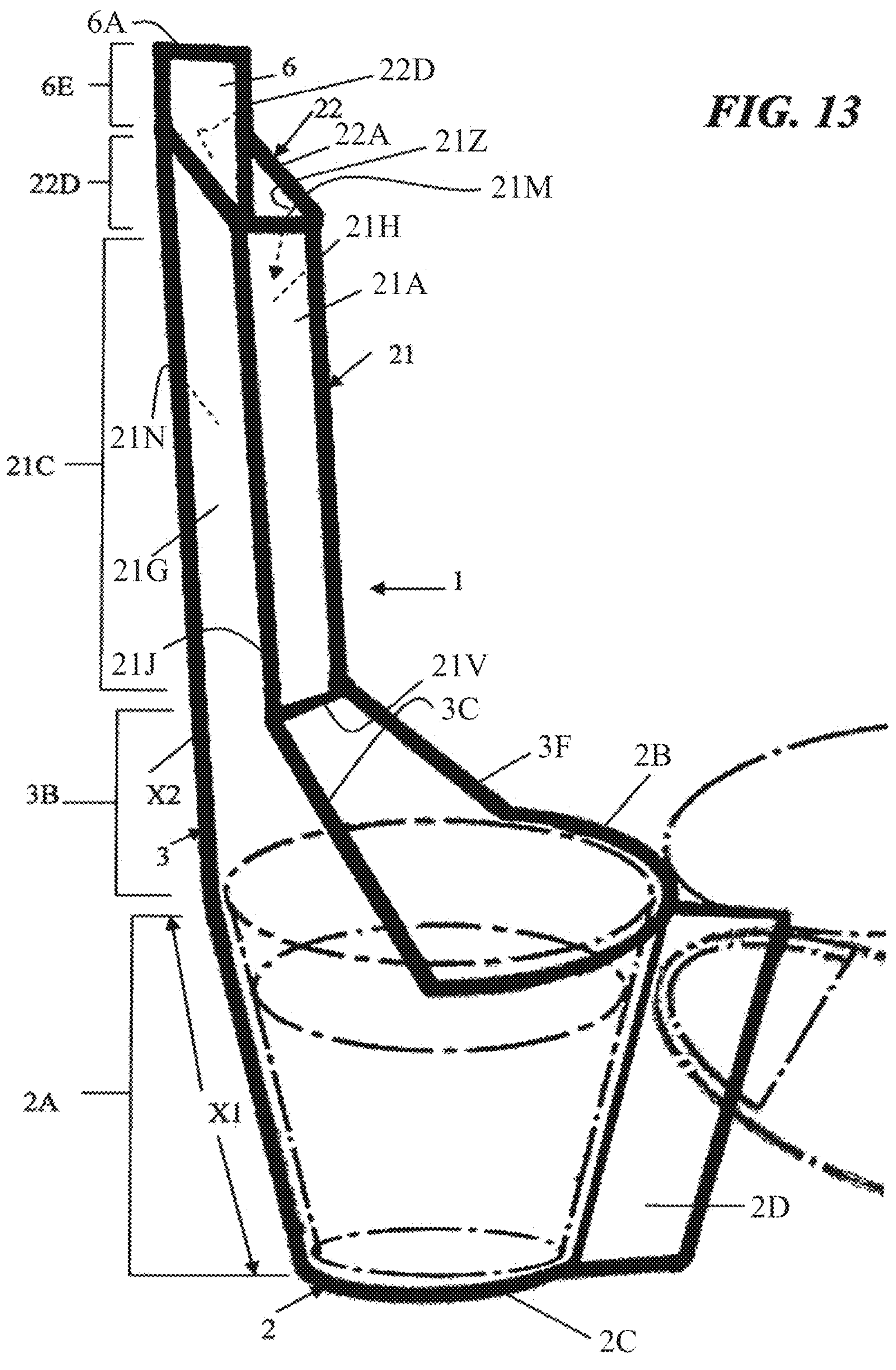
FIG. 13 is a perspective view of a one-piece-single-unit device of a combined vertical scoop-funnel-disposable cup container mate component with a rectangular-prism shaped funnel with a top end rectangular-prism angle cut adjacent scoop along with an extended top end flat square section which has a top end straight line edge section, in accordance with an embodiment of the present invention.

FIG. 13 shows and embodiment of the device 1 that is similar to the embodiment shown in FIG. 9, except that the flat section 6E is present and adjoins the rectangular scoop section 22D opposite the rectangular prism shaped funnel section 21C.

Figure 14:
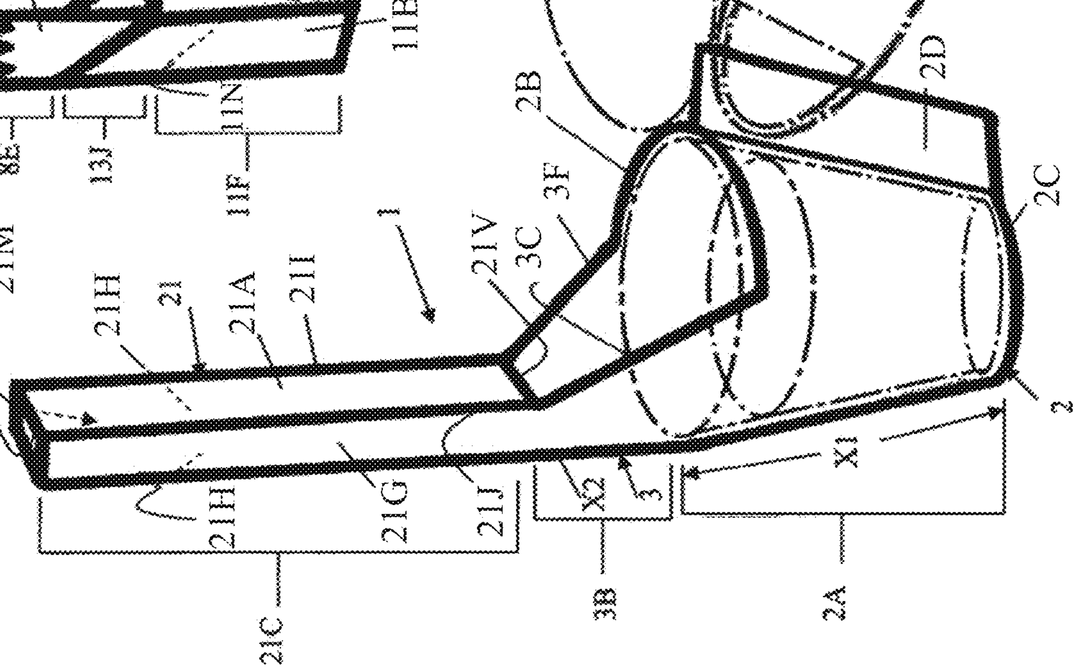
FIG. 14 is a perspective view of a one-piece-single-unit device of a combined vertical scoop-funnel-disposable cup container mate component with a rectangular-prism shaped funnel without a top adjacent scoop along with an extended flat square surface section which has a top end straight line edge section, in accordance with an embodiment of the present invention.

The embodiment of the device 1 shown in FIG. 14 is similar to the embodiment shown in FIG. 13 except that the flat section 6E has been removed.

Figure 15:
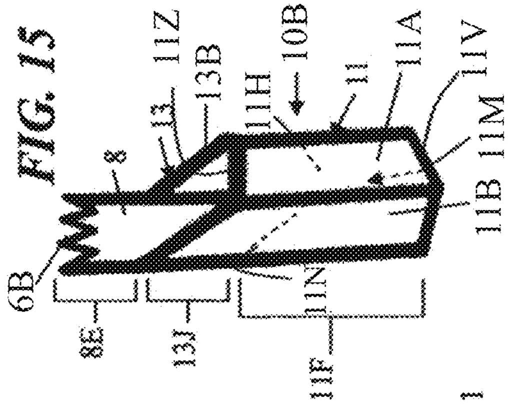
FIG. 15 is a perspective view of an attachable second rectangular-prism shaped scoop funnel head along with an extended flat square surface section which has a straight series of a connected top end evenly spaced and sized beveled edge section, in accordance with an embodiment of the present invention.

FIG. 15 shows a second scoop funnel head 10B, which is attachable to the device 1, and which is made up of a rectangular prism shaped section 11F adjacent to a second scoop section 13J which is adjacent to a flat section 8E, wherein the rectangular prism shaped section 11F, the second scoop section 13J, and the flat section 8E are all integrated into a single piece. The rectangular prism shaped section 11F comprises a rectangular prism shaped funnel 11 which defines a rectangular hollow space 11M. The rectangular prism shaped funnel 11 comprises four side walls: a first side wall 11A, a second side wall 11B, a third side wall 11H, and a fourth side wall 11N, wherein the second side wall 11B and the third side wall 11H are minor side walls of equal size that oppose one another, and wherein the first side wall 11And the fourth side wall 11N are major walls of equal size that oppose one another. A first exit opening 11Z is present on the second scoop funnel head 10B opposite a second exit opening 11V The second opening 11V defines the second scoop section 11J.

Figure 16:
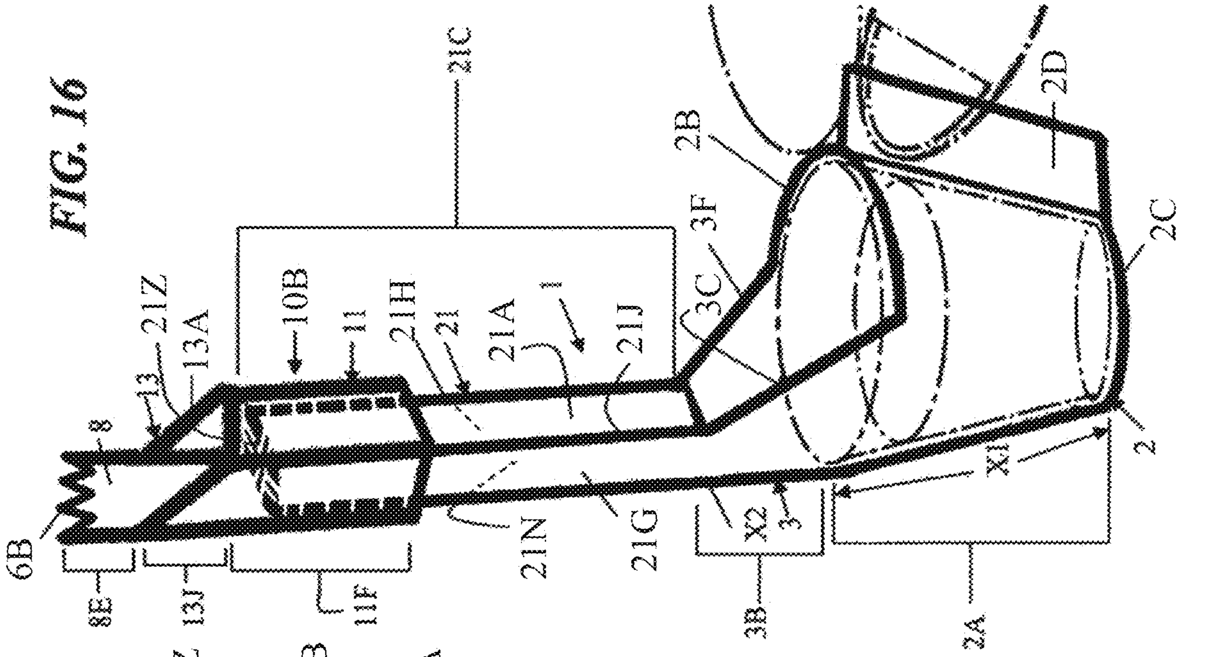
FIG. 16 is a perspective view of a one-piece-single-unit device of combined vertical scoop-funnel-disposable cup container mate component with a connected an attachable second rectangular-prism shaped scoop funnel head along with an extended flat square surface section which has a straight series of a connected top end evenly spaced and sized beveled edge section, in accordance with an embodiment of the present invention.

FIG. 16 shows how the embodiments of FIG. 14 and FIG. 15 can be combined together. I The rectangular prism shaped tube 21 with is coupled and disposed within the second scoop funnel head 10B. During coupling of the second scoop funnel head 10B to the device 1, the first side wall 11A, the second side wall 11B, the third side wall 11H, and the fourth side wall 11N are supported by the first prism side wall 21A, the second prism side wall 21B, the third prism side wall 21G, and the fourth prism side wall 21N, respectively.

Figure 17:
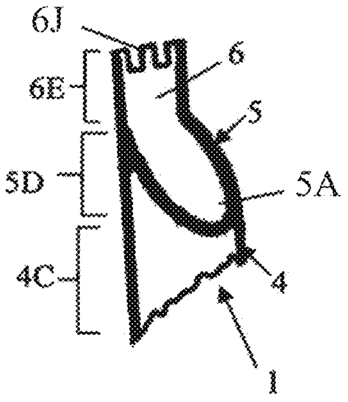
FIG. 17 is a perspective view of a one-piece-single-unit device of a combined vertical scoop-funnel-disposable cup container mate component with the top adjacent scoop, along with an extended and connected top end flat square section which has a straight series of a connected top end evenly spaced and sized square angled edge section, in accordance with an embodiment of the present invention.
Figure 18:
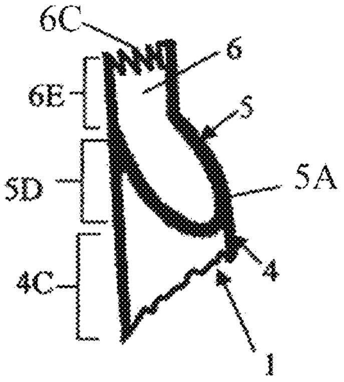
FIG. 18 is a perspective view of a one-piece-single-unit device of a combined vertical scoop-funnel-disposable cup container mate component with the top adjacent scoop, along with an extended and connected top end flat square section which has a straight series of a connected top end evenly spaced and sized chisel beveled edge section, in accordance with an embodiment of the present invention.
Figure 19:
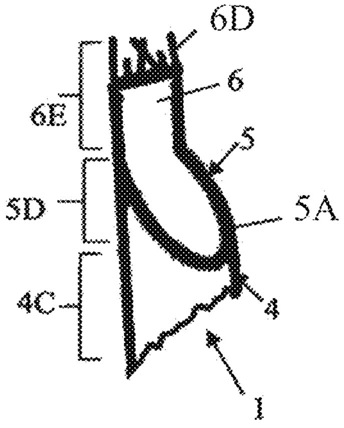
FIG. 19 is a perspective view of a one-piece-single-unit device of a combined vertical scoop-funnel-disposable cup container mate component with the top adjacent scoop, along with an extended and connected top end flat square section which has a protruding series of a top end evenly spaced, unevenly sized and unorganized strip edge section, in accordance with an embodiment of the present invention.
Figure 20:
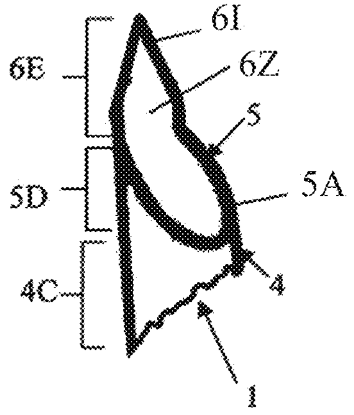
FIG. 20 is a perspective view of a one-piece-single-unit device of combined of a vertical scoop-funnel-disposable cup container mate component with the top adjacent scoop, along with an extended and connected top end flat semi-square section which has an extended top end single bevel edge section, in accordance with an embodiment of the present invention.
Figure 21:
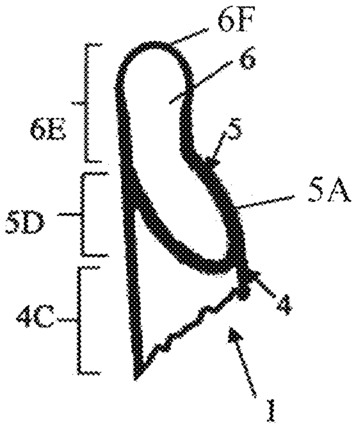
FIG. 21 is a perspective view of a one-piece-single-unit device of a combined vertical scoop-funnel-disposable cup container mate component with the top adjacent scoop, along with an extended and connected top end flat square section which has an extended top end semi-circle edge section, in accordance with an embodiment of the present invention.
Figure 22:
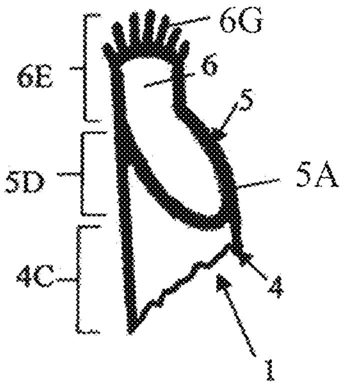
FIG. 22 is a perspective view of a one-piece-single-unit device of a combined vertical scoop-funnel-disposable cup container mate component with the top adjacent scoop, along with an extended and connected top end flat square section which has an extended top end semi-circle edge section along with a protruding fan shape series of a top end evenly spaced, unevenly sized, and organized strip edge section, in accordance with an embodiment of the present invention.
Figure 23:
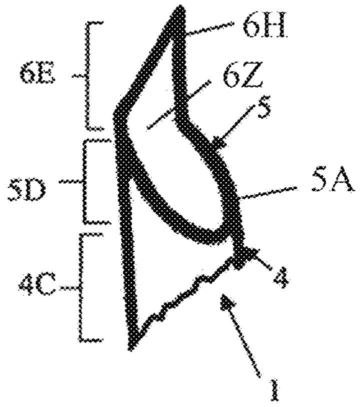
FIG. 23 is a perspective view of a one-piece-single-unit device of a combined vertical scoop-funnel-disposable cup container mate component with the top adjacent scoop, along with an extended and connected top end flat semi-square section which has an extended top end single chisel bevel edge section, in accordance with an embodiment of the present invention.
Figure 24:
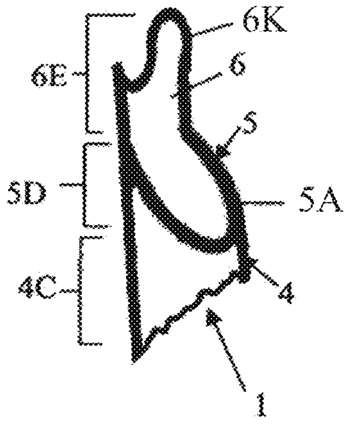
FIG. 24 is a perspective view of a one-piece-single-unit device of a combined vertical scoop-funnel-disposable cup container mate component with the top adjacent scoop, along with an extended and connected top end flat square section which has an extended top end wave shaped line edge section, in accordance with an embodiment of the present invention.
Figure 25:
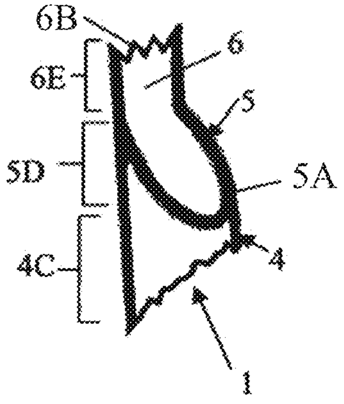
FIG. 25 is a perspective view of a one-piece-single-unit device of a combined vertical scoop-funnel-disposable cup container mate component with the top adjacent scoop, along with an extended and connected top end flat square section which has a straight series of a connected top end evenly spaced and sized beveled edge section, in accordance with an embodiment of the present invention.

FIG. 17 through FIG. 25 show variations of the embodiment of the device 1 shown in FIG. 1. In particular, each of the variations of the device 1 shown in FIGS. 17-25 depict variations of the flat section 6E. FIG. 17 shows the flat section 6E wherein the flat edge 6A shown in FIG. 1 has been replaced with a square angled edge 6J, which comprises a plurality of evenly spaced and evenly sized square protrusions. FIG. 18 shows the flat section 6E wherein the flat edge 6A shown in FIG. 1 has been replaced with a chisel beveled edge 6C, which comprises a plurality of evenly spaced and evenly sized chisel protrusions. FIG. 19 shows the flat section 6E wherein the flat edge 6A shown in FIG. 1 has been replaced with an unorganized strip edge 6D, which comprises a plurality of evenly spaced and unevenly sized protrusions. FIG. 20 shows the flat section 6E wherein the flat edge 6A shown in FIG. 1 has been replaced with a single beveled edge 6I, which comprises a single beveled edge. FIG. 21 shows the flat section 6E wherein the flat edge 6A shown in FIG. 1 has been replaced with a semicircle edge 6F, which comprises a semicircle edge. FIG. 22 shows the flat section 6E wherein the flat edge 6A shown in FIG. 1 has been replaced with an organized strip edge 6G, which comprises a plurality of evenly spaced and evenly sized strips. FIG. 23 shows the flat section 6E wherein the flat edge 6A shown in FIG. 1 has been replaced with a single chisel beveled edge 6H, which comprises a single chisel-shaped beveled edge. FIG. 24 shows the flat section 6E wherein the flat edge 6A shown in FIG. 1 has been replaced with a wave-shaped edge 6K. FIG. 25 shows the flat section 6E wherein the flat edge 6A shown in FIG. 1 has been replaced with a beveled edge 6B, which comprises a plurality of evenly spaced and evenly sized beveled edges.

Figure 28:
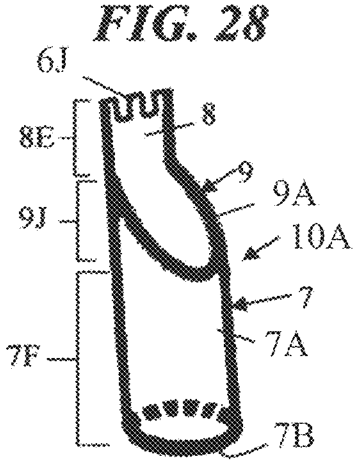
FIG. 28 is a perspective view of an attachable second scoop funnel head along with an extended top end flat square section which has a straight series of a connected top end evenly spaced and sized square angled edge section, in accordance with an embodiment of the present invention.
Figure 29:
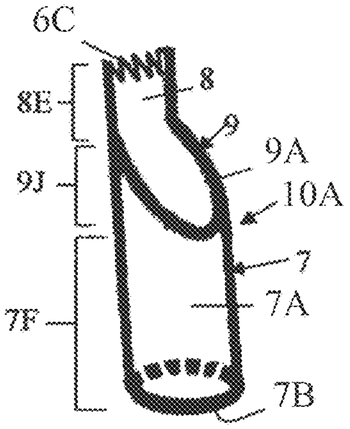
FIG. 29 is a perspective view of an attachable second scoop funnel head along with an extended top end flat square section which has a straight series of a connected top end evenly spaced and sized chisel beveled edge section, in accordance with an embodiment of the present invention.
Figure 30:
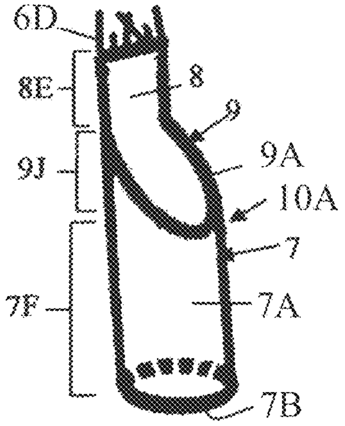
FIG. 30 is a perspective view of an attachable second scoop funnel head along with an extended top end flat square section which has a protruding series of a top end evenly spaced, unevenly sized and unorganized strip edge section, in accordance with an embodiment of the present invention.
Figure 31:
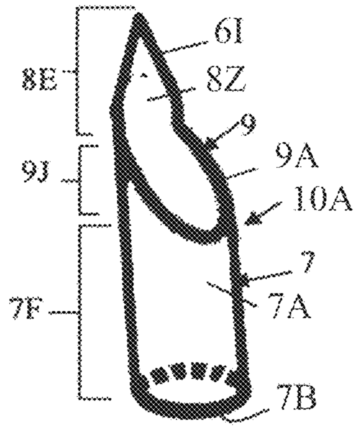
FIG. 31 is a perspective view of an attachable second scoop funnel head along with an extended top end flat semi-square section which has an extended top end single bevel edge section, in accordance with an embodiment of the present invention.
Figure 32:
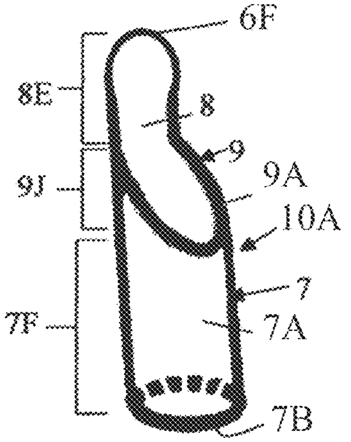
FIG. 32 is a perspective view of an attachable second scoop funnel head along with an extended top end flat square section which has an extended top end semi-circle edge section, in accordance with an embodiment of the present invention.
Figure 33:
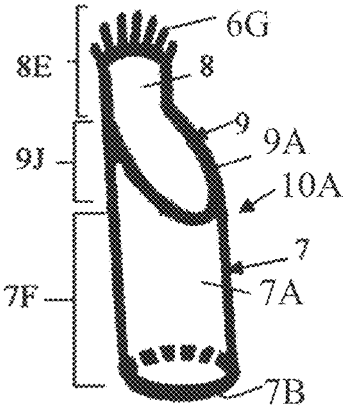
FIG. 33 is a perspective view of an attachable second scoop funnel head along with an extended top end flat square section which has an extended top end semi-circle edge section along with a protruding fan shape series of a top end evenly spaced, unevenly sized, and organized strip edge section, in accordance with an embodiment of the present invention.
Figure 34:
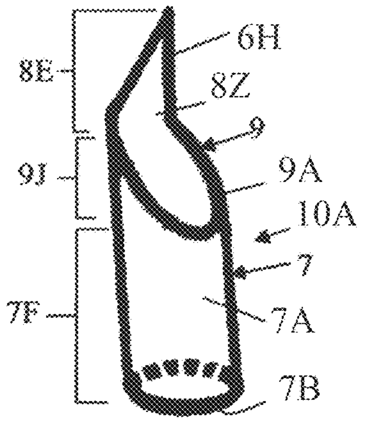
FIG. 34 is a perspective view of an attachable second scoop funnel head along with an extended top end flat semi-square section which has an extended top end single chisel bevel edge section, in accordance with an embodiment of the present invention.
Figure 26:
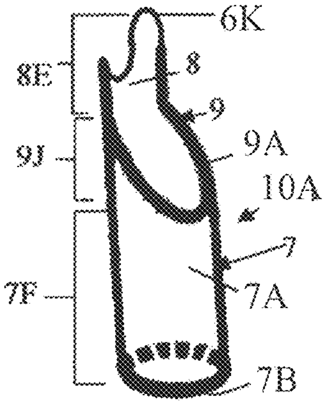
FIG. 26 is a perspective view of an attachable second scoop funnel head along with an extended top end flat square section which has an extended top end wave shaped line edge section, in accordance with an embodiment of the present invention.
Figure 27:
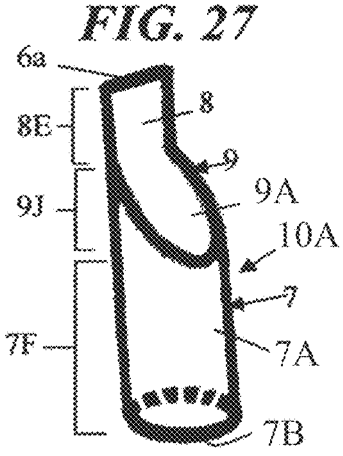
FIG. 27 is a perspective view of an attachable second scoop funnel head along with an extended top end flat square section which has a top end straight line edge section, in accordance with an embodiment of the present invention.

FIG. 26 through FIG. 34 show variations of the embodiment of the secondary funnel 7 shown in FIG. 5. In particular, each of the variations of the secondary funnel shown in FIGS. 26-34 depict variations of the flat section 8E. FIG. 26 shows the flat section 6E wherein the beveled edge 6B shown in FIG. 5 has been replaced with a wave-shaped edge 6K. FIG. 27 shows the flat section 6E wherein the beveled edge 6B shown in FIG. 5 has been replaced with the flat edge 6A. FIG. 28 shows the flat section 6E wherein the beveled edge 6B shown in FIG. 5 has been replaced with the square angled edge 6J. FIG. 29 shows the flat section 6E wherein the beveled edge 6B shown in FIG. 5 has been replaced with the chisel beveled edge 6C. FIG. 30 shows the flat section 6E wherein the beveled edge 6B shown in FIG. 5 has been replaced with the unorganized strip edge 6D. FIG. 31 shows the flat section 6E wherein the beveled edge 6B shown in FIG. 5 has been replaced with the single bevel edge 6I. FIG. 32 shows the flat section 6E wherein the beveled edge 6B shown in FIG. 5 has been replaced with the semicircle edge 6F. FIG. 33 shows the flat section 6E wherein the beveled edge 6B shown in FIG. 5 has been replaced with the organized strip edge 6G. FIG. 34 shows the flat section 6E wherein the beveled edge 6B shown in FIG. 5 has been replaced with the single chisel beveled edge 6H.

Figure 35:
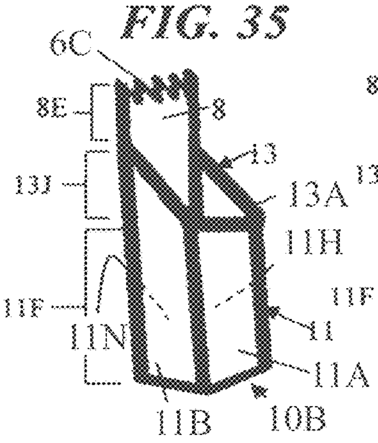
FIG. 35 is a perspective view of an attachable second rectangular-prism shape scoop funnel head along with an extended top end flat square section which has a straight series of a connected top end evenly spaced and sized chisel beveled edge section, in accordance with an embodiment of the present invention.
Figure 36:
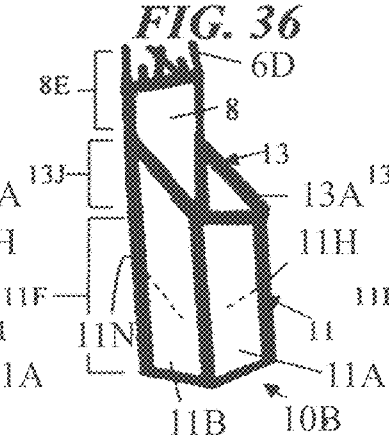
FIG. 36 is a perspective view of an attachable second rectangular-prism shape scoop funnel head along with an extended top end flat square section which has a protruding series of a top end evenly spaced, unevenly sized and unorganized strip edge section, in accordance with an embodiment of the present invention.
Figure 37:
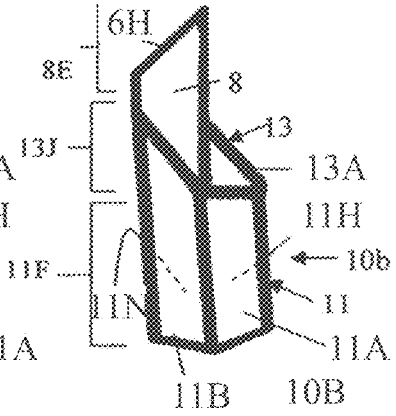
FIG. 37 is a perspective view of an attachable second rectangular-prism shape scoop funnel head along with an extended top end flat square section which has an extended top end single chisel bevel edge section, in accordance with an embodiment of the present invention.
Figure 38:
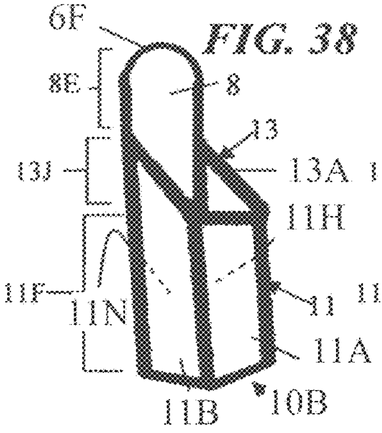
FIG. 38 is a perspective view of an attachable second rectangular-prism shape scoop funnel head along with an extended top end flat square section which has an extended top end semi-circle edge section, in accordance with an embodiment of the present invention.
Figure 39:
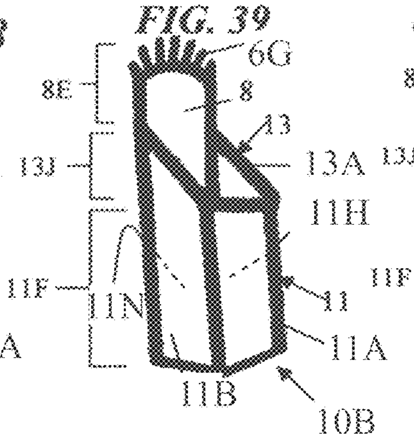
FIG. 39 is a perspective view of an attachable second rectangular-prism shape scoop funnel head along with an extended top end flat square section which has an extended top end semi-circle edge section along with a protruding fan shape series of a top end evenly spaced, unevenly sized, and organized strip edge section, in accordance with an embodiment of the present invention.
Figure 40:
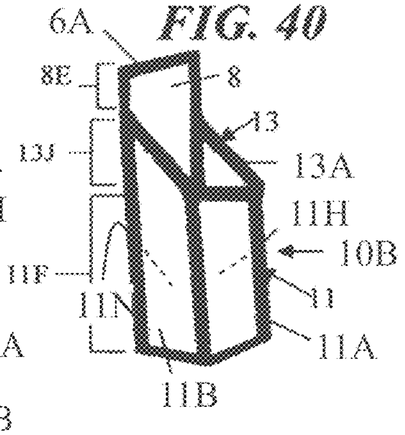
FIG. 40 is a perspective view of an attachable second rectangular-prism shape scoop funnel head along with an extended top end flat square section which has a top end straight line edge section, in accordance with an embodiment of the present invention.
Figure 43:
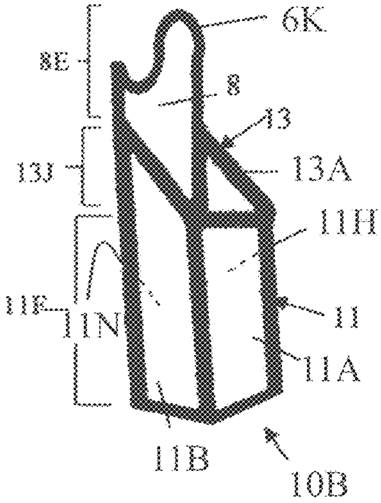
FIG. 43 is a perspective view of an attachable second rectangular-prism shape scoop funnel head along with an extended top end flat square section which has an extended top end wave shaped line edge section, in accordance with an embodiment of the present invention.
Figure 41:
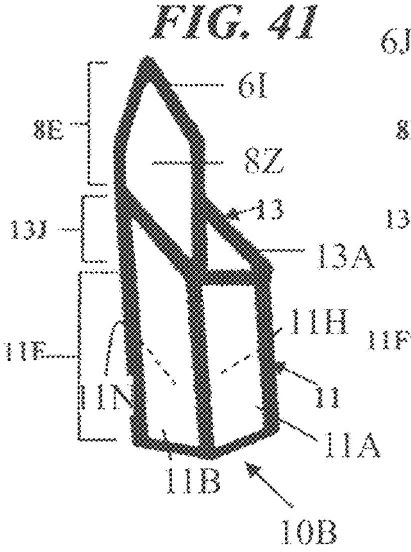
FIG. 41 is a perspective view of an attachable second rectangular-prism shape scoop funnel head along with an extended top end flat semi-square section which has an extended top end single V shaped bevel edge section, in accordance with an embodiment of the present invention.
Figure 42:
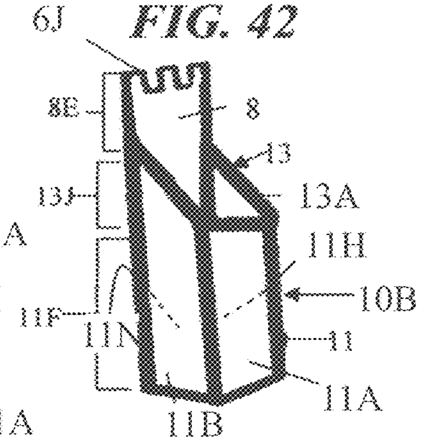
FIG. 42 is a perspective view of an attachable second rectangular-prism shape scoop funnel head along with an extended top end flat square section which has a straight series of a connected top end evenly spaced and sized square angled edge section, in accordance with an embodiment of the present invention.

FIG. 35 through FIG. 43 show variations of the embodiment of the rectangular prism shaped funnel 11 shown in FIG. 15. In particular, each of the variations of the rectangular prism shaped funnel 11 shown in FIGS. 26-34 depict variations of the flat section 8E. FIG. 35 shows the flat section 8E wherein the beveled edge 6B shown in FIG. 15 has been replaced with a chisel beveled edge 6C. FIG. 36 shows the flat section 8E wherein the beveled edge 6B shown in FIG. 15 has been replaced with the unorganized strip edge 6D. FIG. 37 shows the flat section 8E wherein the beveled edge 6B shown in FIG. 15 has been replaced with the single chisel beveled edge 6H. FIG. 38 shows the flat section 8E wherein the beveled edge 6B shown in FIG. 15 has been replaced with the semicircle edge 6F. FIG. 39 shows the flat section 8E wherein the beveled edge 6B shown in FIG. 15 has been replaced with the organized strip edge 6G. FIG. 40 shows the flat section 8E wherein the beveled edge 6B shown in FIG. 15 has been replaced with the flat edge 6A. FIG. 43 shows the flat section 8E wherein the beveled edge 6B shown in FIG. 15 has been replaced with the wave-shaped edge 6K. FIG. 41 shows the flat section 8E wherein the beveled edge 6B shown in FIG. 5 has been replaced with the single bevel edge 61. FIG. 34 shows the flat section 8E wherein the beveled edge 6B shown in FIG. 5 has been replaced with the square angled edge 6J.

Figure 44:
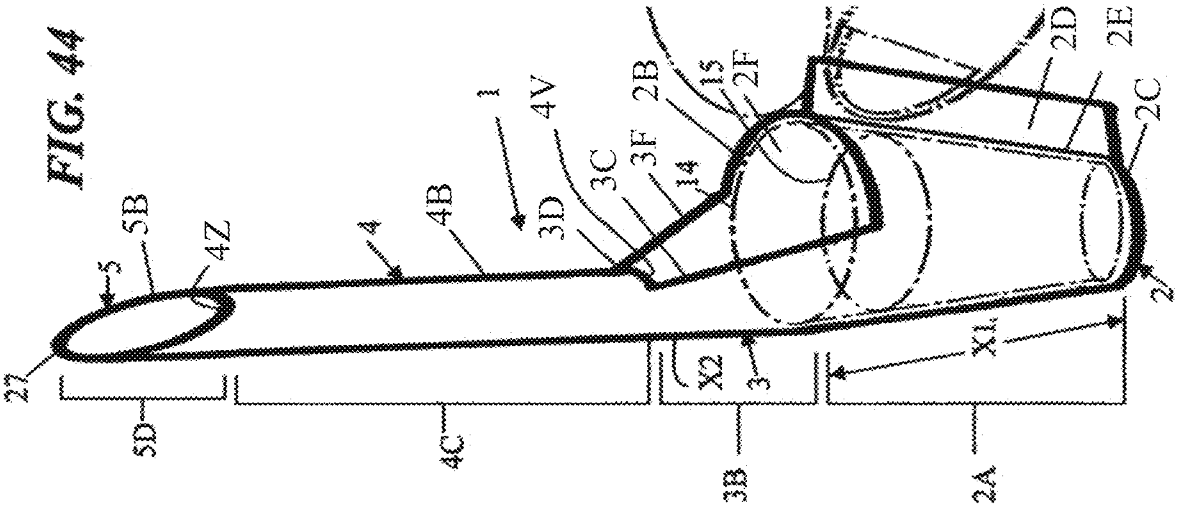
FIG. 44 is a perspective view of a one-piece-single-unit device of a combined vertical scoop-funnel-disposable cup container mate component with a top full-elliptical opened adjacent scoop which has a top end curved line edge section, in accordance with an embodiment of the present invention.

FIG. 44 is similar to FIG. 1 but shows and embodiment of the device 1 which has no flat section 6E and in which the scoop section 5D has been modified. Specifically, the scoop section 5D, in the embodiment of FIG. 44, comprises a fully elliptical opening 5B which defines a top curved edge 27.

Figure 45:
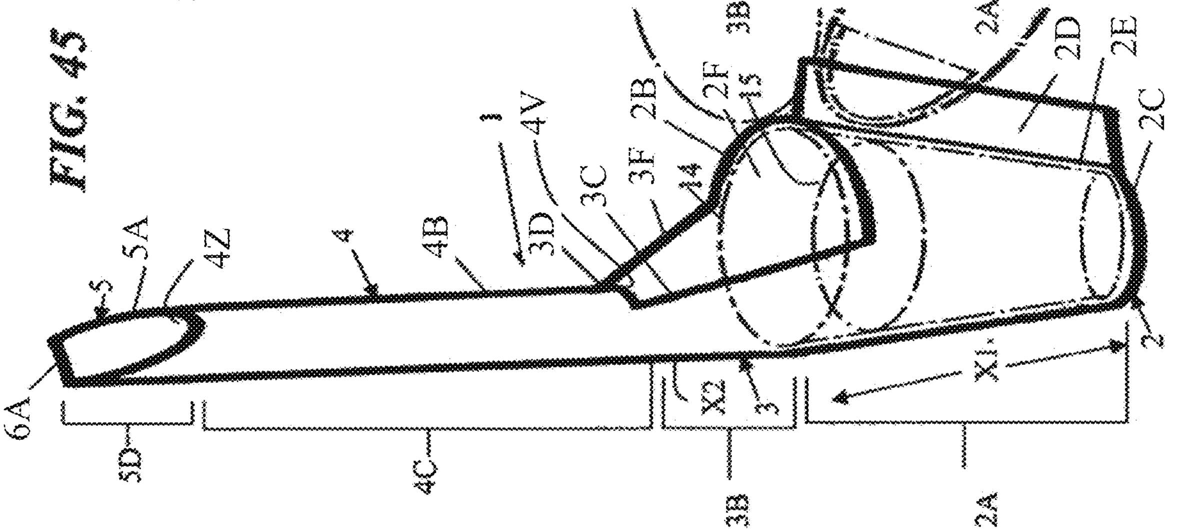
FIG. 45 is a perspective view of a one-piece-single-unit device of a combined vertical scoop-funnel-disposable cup container mate component with a top semi-elliptical opened adjacent scoop which has a top end straight line edge section, in accordance with an embodiment of the present invention.

FIG. 45 is similar to FIG. 1 but shows an embodiment of the device 1 which has no flat section 6E. Because the embodiment shown in FIG. 45 has no flat section 6E, the scoop section 5D terminates in the flat edge 6A.

Figure 46:
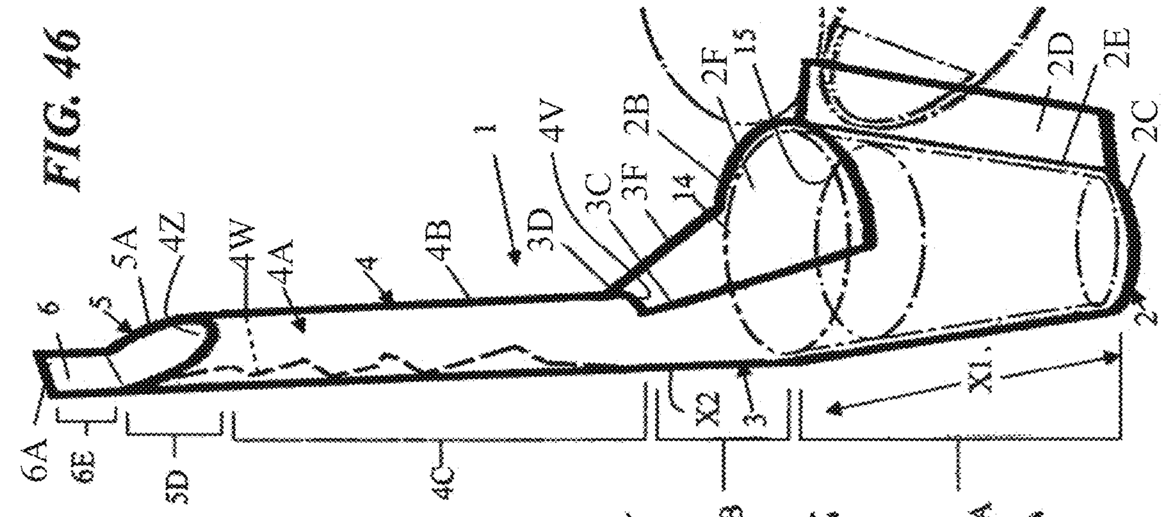
FIG. 46 is a perspective view of a one-piece-single-unit device of a combined vertical scoop-funnel-disposable cup container mate component with having an uneven internal surface tube, in accordance with an embodiment of the present invention.

FIG. 46 is similar to FIG. 1 but shows an embodiment of the device 1 wherein the tube 4 comprises an uneven internal surface 4W. Manipulation of the travel of the liquid material 15 is further enabled by changes in the length and shape of the tube 4 and the uneven internal surface 4W.

Figure 47:
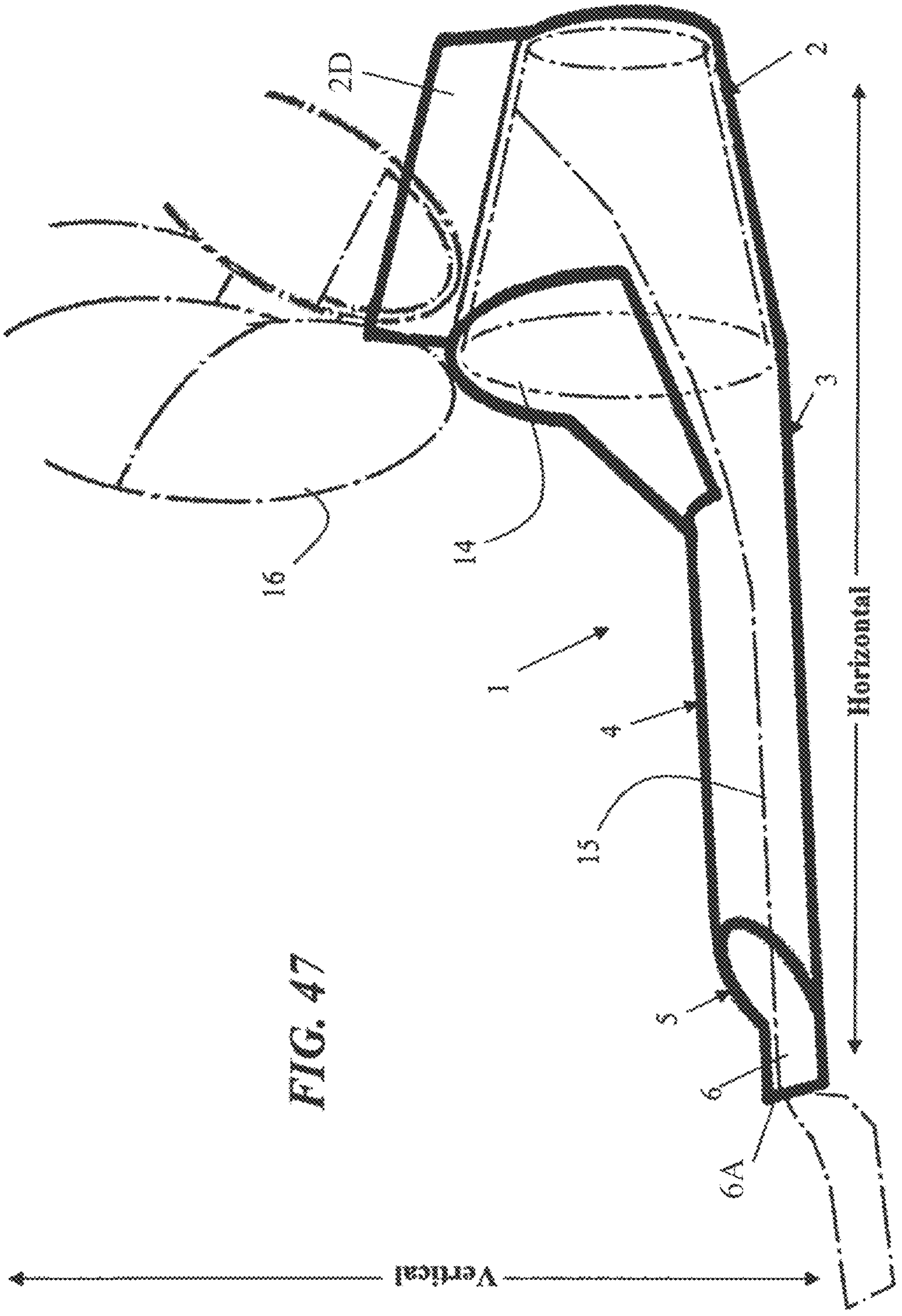
FIG. 47 shows the FIG. 1 pouring flowable material from a disposable cup through the funnel by passing over the scoop's top end edge on an external surface in a horizontal level position.

FIG. 47 shows the device 1 in the pouring position, wherein the device 1 is oriented primarily along a horizontal axis. In this orientation, the liquid material 15 can pour from the standard cup 14 through the tube 4 onto the external surface which is placed inside the vertical cup container 2. This gives a high level of control in the liquid paint pouring process.

Figure 48:
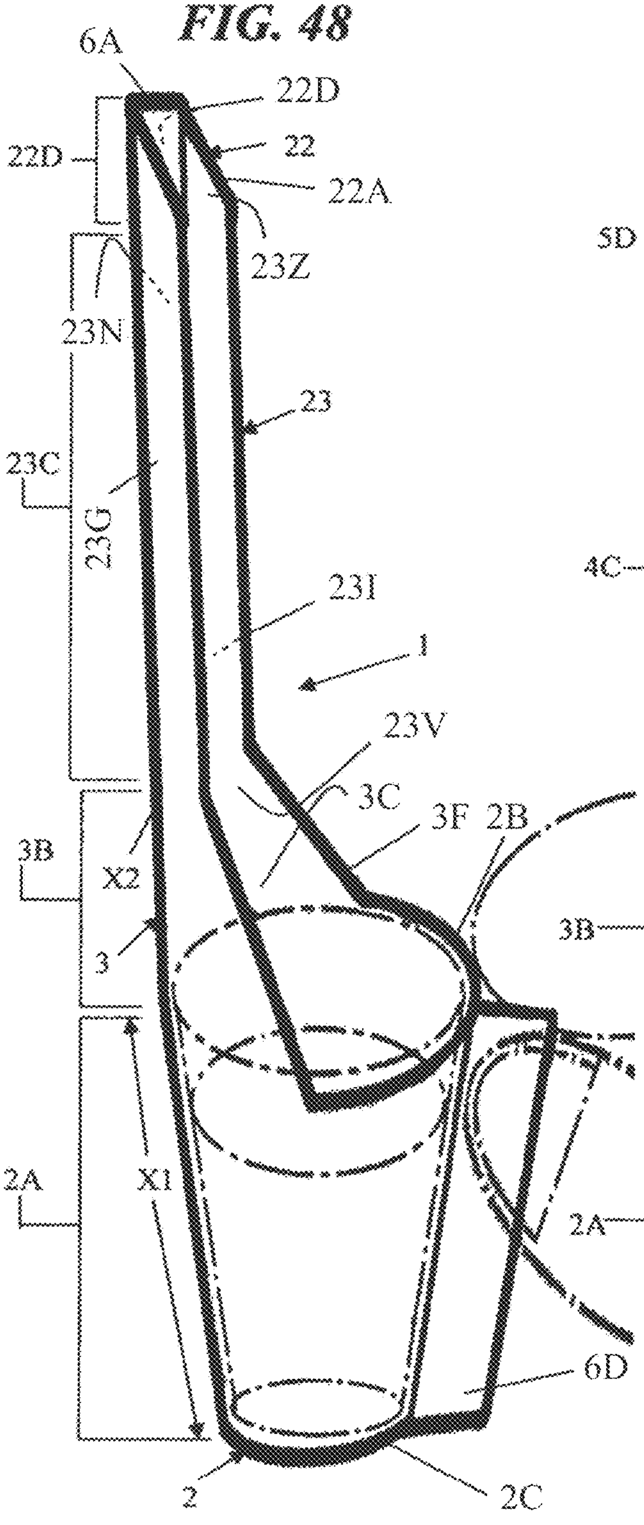
FIG. 48 is a perspective view of a one-piece-single-unit device of a combined vertical scoop-funnel-disposable cup container mate component with a vertical staple shaped funnel with a top end staple shape angle cut adjacent scoop which has a top end straight line edge section, in accordance with an embodiment of the present invention.

FIG. 48 shows an embodiment of the device 1 which is similar to the embodiment shown in FIG. 10 but does not comprise a flat section 6E. As a result, the rectangular scoop section 22D terminates in the flat edge 6A.

Figure 49:
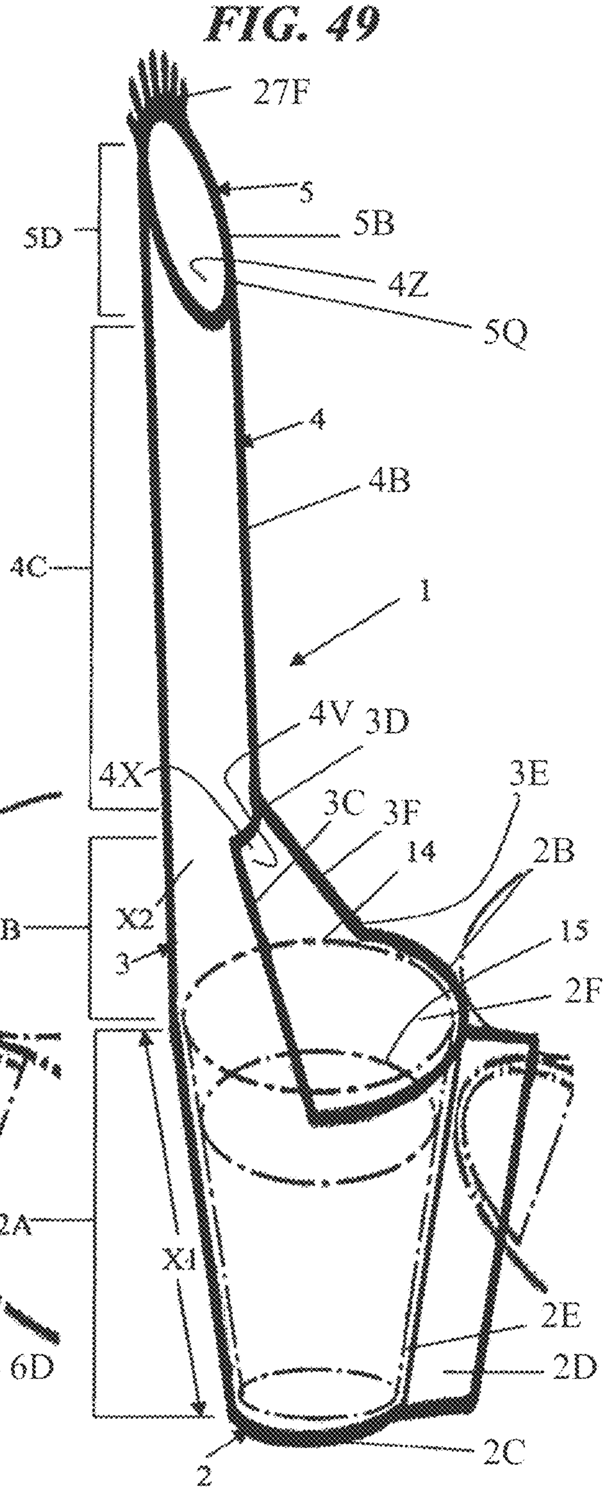
FIG. 49 is a perspective view of a one-piece-single-unit device of a combined vertical scoop-funnel-disposable cup container mate component with a top full-elliptical opened adjacent scoop along with a top end curved line edge which has a protruding fan shape series of a top end evenly spaced, unevenly sized and organized strip edge section, in accordance with an embodiment of the present invention.

FIG. 49 shows an embodiment of the device 1 which is similar to the embodiment of the device 1 shown in FIG. 44, but wherein the scoop section 5D comprises an organized strip edge 27F. The organized strip edge 27F is similar to the top curved edge 27 but comprises a plurality of evenly spaced, unevenly sized, organized strips.

Figure 50:
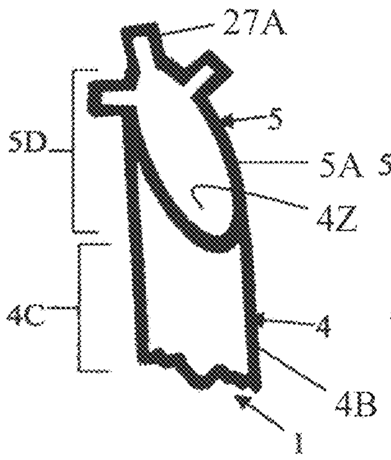
FIG. 50 is a perspective view of a one-piece-single-unit device of a combined vertical scoop-funnel-disposable cup container mate component along with a top vertical adjacent incomplete-elliptical opened scoop which has an extended fan shape series of a top end evenly spaced and sized square angled edge section, in accordance with an embodiment of the present invention.
Figure 51:
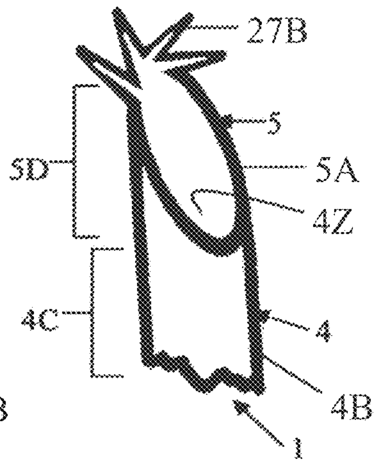
FIG. 51 is a perspective view of a one-piece-single-unit device of a combined vertical scoop-funnel-disposable cup container mate component along with a top vertical adjacent incomplete-elliptical opened scoop which has an extended fan shape series of a connected top end evenly spaced and sized chisel beveled edge section, in accordance with an embodiment of the present invention.
Figure 52:
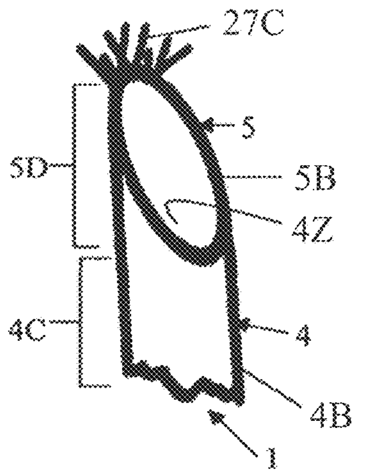
FIG. 52 is a perspective view of a one-piece-single-unit device of a combined vertical scoop-funnel-disposable cup container mate component along with a top vertical adjacent full-elliptical opened scoop which has a protruding fan shape series of a top end evenly spaced, unevenly sized and unorganized strip edge section, in accordance with an embodiment of the present invention.
Figure 53:
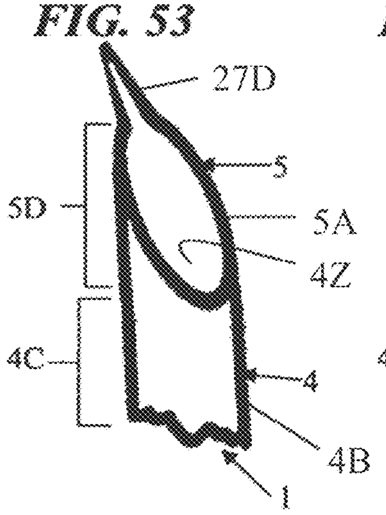
FIG. 53 is a perspective view of a one-piece-single-unit device of a combined vertical scoop-funnel-disposable cup container mate component along with a top vertical adjacent incomplete-elliptical opened scoop which has an extended top end single V shaped bevel edge section, in accordance with an embodiment of the present invention.
Figure 54:
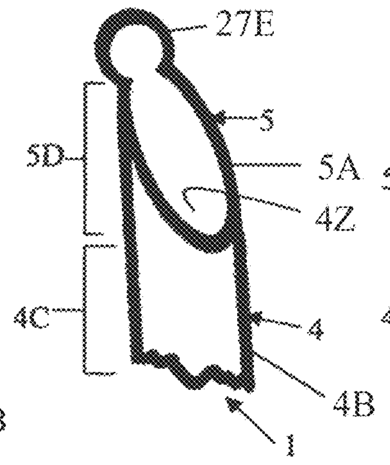
FIG. 54 is a perspective view of a one-piece-single-unit device of a combined vertical scoop-funnel-disposable cup container mate component along with a top vertical adjacent incomplete-elliptical opened scoop which has an extended top end semi-circle edge section, in accordance with an embodiment of the present invention.
Figure 55:
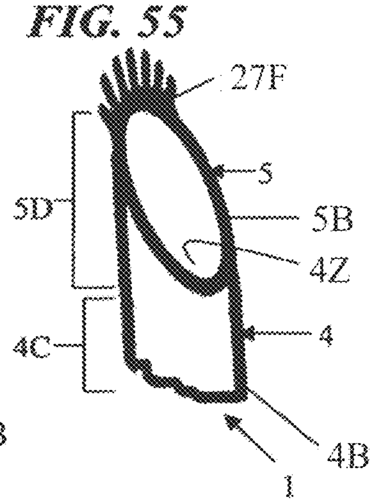
FIG. 55 is a perspective view of a one-piece-single-unit device of a combined vertical scoop-funnel-disposable cup container mate component along with a top vertical adjacent full-elliptical opened scoop which has a protruding fan shape series of a top end evenly spaced, unevenly sized and organized strip edge section, in accordance with an embodiment of the present invention.
Figure 56:
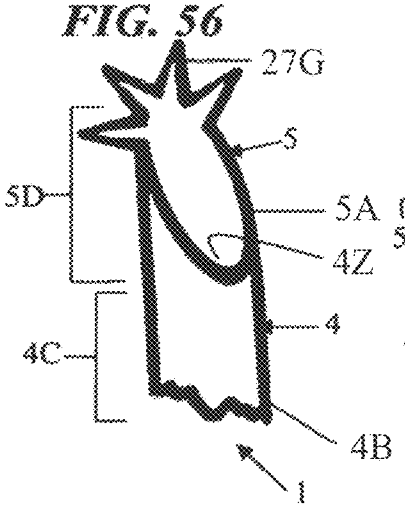
FIG. 56 is a perspective view of a one-piece-single-unit device of a combined vertical scoop-funnel-disposable cup container mate component along with a top vertical adjacent incomplete-elliptical opened scoop which has an extended fan shape series of a connected top end evenly spaced and sized V shaped bevel edge section, in accordance with an embodiment of the present invention.
Figure 57:
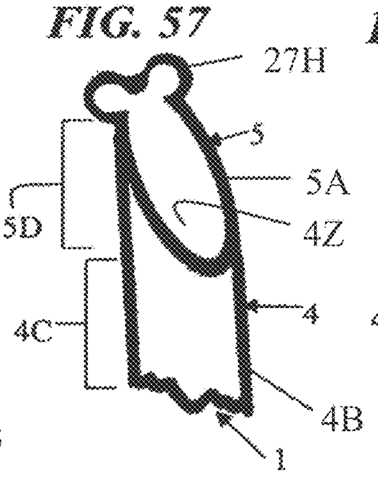
FIG. 57 is a perspective view of a one-piece-single-unit device of a combined vertical scoop-funnel-disposable cup container mate component along with a top vertical adjacent incomplete-elliptical opened scoop which has an extended fan shape series of a connected top end evenly spaced and sized wave angle edge section, in accordance with an embodiment of the present invention.
Figure 58:
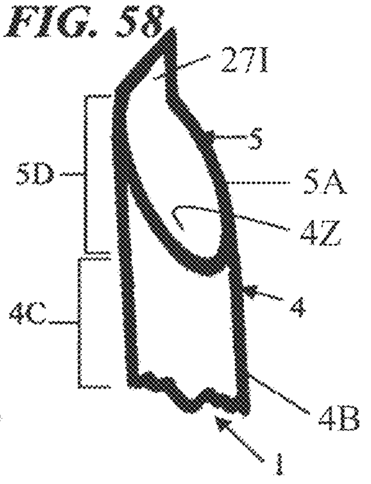
FIG. 58 is a perspective view of a one-piece-single-unit device of a combined vertical scoop-funnel-disposable cup container mate component along with a top vertical adjacent incomplete-elliptical opened scoop which has an extended top end single chisel bevel edge section, in accordance with an embodiment of the present invention.

FIG. 50 through FIG. 58 each depict variations of the embodiment of the scoop section 5D shown in FIG. 44 wherein the top curved edge 27 is replaced. FIG. 50 shows a variation of the scoop section 5D wherein the top curved edge 27 shown in FIG. 44 is replaced with a square protrusions edge 27A, which comprises a plurality of evenly spaced and sized square angled protrusions. FIG. 51 shows a variation of the scoop section 5D wherein the top curved edge 27 shown in FIG. 44 is replaced with a chisel protrusions edge 27B, which comprises a plurality of evenly spaced and sized chisel beveled edges. FIG. 52 shows a variation of the scoop section 5D wherein the top curved edge 27 shown in FIG. 44 is replaced with a disorganized strip edge 27C, which comprises a plurality of evenly spaced and unevenly sized strips. FIG. 53 shows a variation of the scoop section 5D wherein the top curved edge 27 shown in FIG. 44 is replaced with a v-shaped bevel edge 27D which comprises a single v-shaped bevel. FIG. 54 shows a variation of the scoop section 5D wherein the top curved edge 27 shown in FIG. 44 is replaced with semicircle edge 27E, which comprises a semicircle protrusion. FIG. 55 shows a variation of the scoop section 5D wherein the top curved edge 27 shown in FIG. 44 is replaced with an organized strip edge 27F, which comprises a plurality of evenly spaced and unevenly organized strips. FIG. 56 shows a variation of the scoop section 5D wherein the top curved edge 27 shown in FIG. 44 is replaced with a v-shaped protrusions edge 27G, which comprises a plurality of evenly spaced and sized v-shaped protrusions. FIG. 57 shows a variation of the scoop section 5D wherein the top curved edge 27 shown in FIG. 44 is replaced with a wave protrusions edge 27H, which comprises evenly spaced and sized waves. FIG. 58 shows a variation of the scoop section 5D wherein the top curved edge 27 shown in FIG. 44 is replaced with a single chisel protrusion edge 27I, which comprises a single chisel protrusion.

Figure 59:
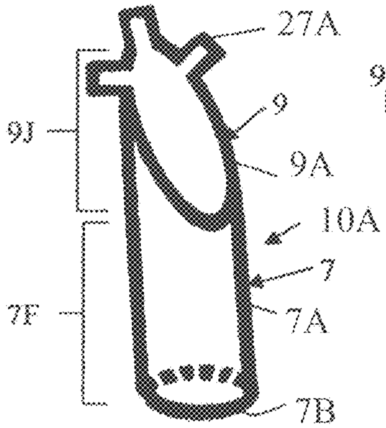
FIG. 59 is a perspective view of an attachable second scoop funnel head along with a top vertical adjacent incomplete-elliptical opened scoop which has an extended fan shape series of a top end evenly spaced and sized square angled edge section, in accordance with an embodiment of the present invention.
Figure 60:
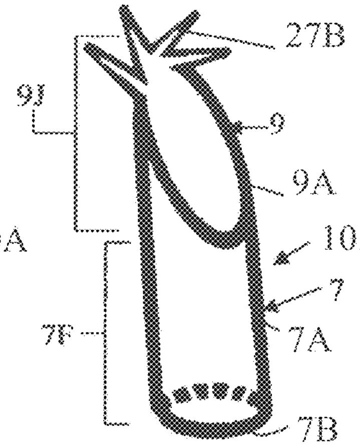
FIG. 60 is a perspective view of an attachable second scoop funnel head along with a top vertical adjacent incomplete-elliptical opened scoop which has an extended fan shape series of a connected top end evenly spaced and sized chisel beveled edge section, in accordance with an embodiment of the present invention.
Figure 61:
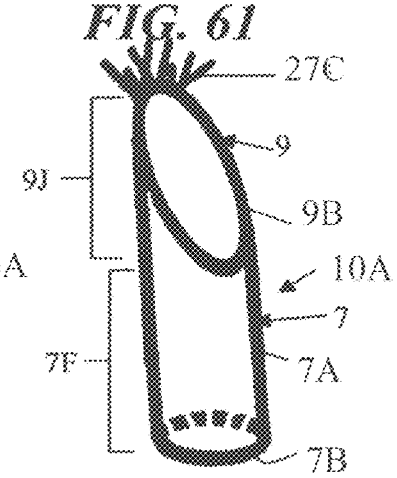
FIG. 61 is a perspective view of an attachable second scoop funnel head along with a top vertical adjacent full-elliptical opened scoop which has a protruding series of a top end evenly spaced, unevenly sized and unorganized strip edge section, in accordance with an embodiment of the present invention.
Figure 62:
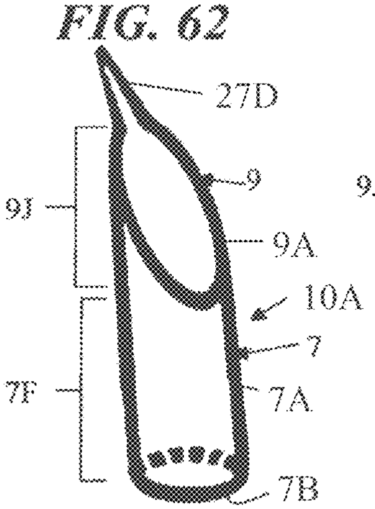
FIG. 62 is a perspective view of an attachable second scoop funnel head along with a top vertical adjacent incomplete-elliptical opened scoop which has an extended top end single V shaped bevel edge section, in accordance with an embodiment of the present invention.
Figure 63:
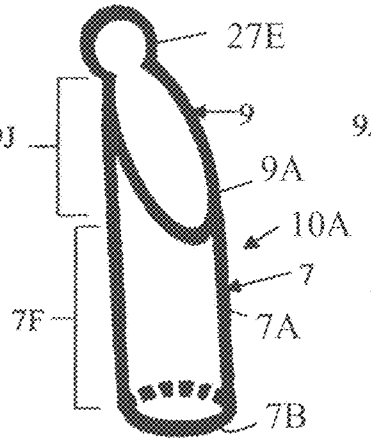
FIG. 63 is a perspective view of an attachable second scoop funnel head along with a top vertical adjacent incomplete-elliptical opened scoop which has an extended top end semi-circle edge section, in accordance with an embodiment of the present invention.
Figure 64:
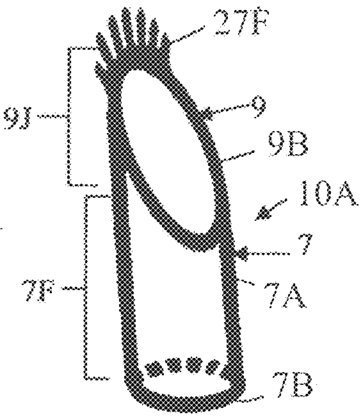
FIG. 64 is a perspective view of an attachable second scoop funnel head along with a top vertical adjacent full-elliptical opened scoop which has a protruding fan shape series of a top end evenly spaced, unevenly sized and organized strip edge section, in accordance with an embodiment of the present invention.
Figure 65:
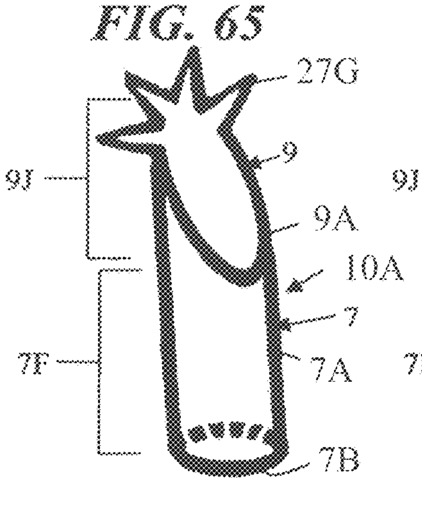
FIG. 65 is a perspective view of an attachable second scoop funnel head along with a top vertical adjacent incomplete-elliptical opened scoop which has an extended fan shape series of a connected top end evenly spaced and sized V shaped bevel edge section, in accordance with an embodiment of the present invention.
Figure 66:
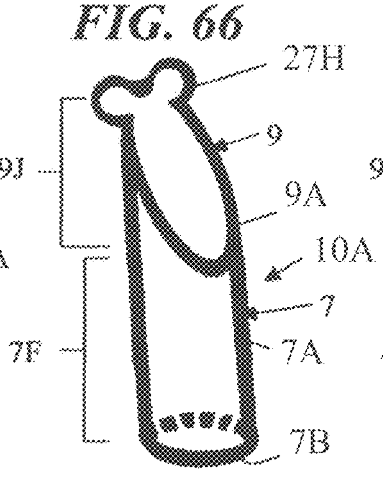
FIG. 66 is a perspective view of an attachable second scoop funnel head along with a top vertical adjacent incomplete-elliptical opened scoop which has an extended fan shape series of a connected top end evenly spaced and sized wave angle edge section, in accordance with an embodiment of the present invention.
Figure 67:
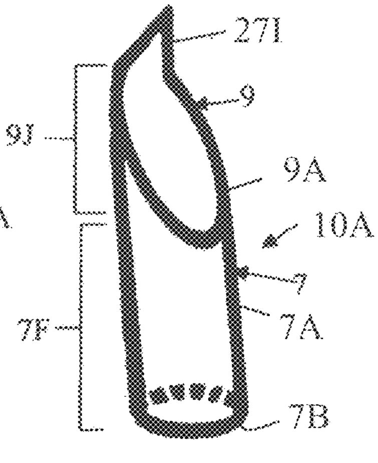
FIG. 67 is a perspective view of an attachable second scoop funnel head along with a top vertical adjacent incomplete-elliptical opened scoop which has an extended top end single chisel bevel edge section, in accordance with an embodiment of the present invention.

FIG. 59 through FIG. 67 each depict variations of the embodiment of the secondary funnel 7 shown in FIG. 5 wherein the flat section 8E is removed, and further wherein the secondary scoop section 9J has been modified. FIG. 59 shows a variation of the scoop secondary scoop section 9J which comprises the square protrusions edge 27A. FIG. 60 shows a variation of the scoop secondary scoop section 9J which comprises the chisel protrusions edge 27B. FIG. 61 shows a variation of the scoop secondary scoop section 9J which comprises the disorganized strip edge 27C. FIG. 62 shows a variation of the scoop secondary scoop section 9J which comprises the v-shaped bevel edge 27D. FIG. 63 shows a variation of the scoop secondary scoop section 9J which comprises the semicircle edge 27E. FIG. 64 shows a variation of the scoop secondary scoop section 9J which comprises the organized strip edge 27F. FIG. 65 shows a variation of the scoop secondary scoop section 9J which comprises the v-shaped protrusions edge 27G. FIG. 66 shows a variation of the scoop secondary scoop section 9J which comprises the wave protrusions edge 27H. FIG. 67 shows a variation of the scoop secondary scoop section 9J which comprises the single chisel protrusion edge 27I.

The invention claimed is:

1. A device for pouring a liquid material onto an external surface comprising:

a container section comprising a cup container, said cup container comprising a hollow tube with a bottom edge and a top edge that defines a top opening, said top opening being sized and disposed to receive a cup, wherein a handle is attached to said container section, said handle having a flat parallelogram shape;

a funnel section connected to the top edge of the container section, said funnel section being bowl-shaped and comprising a funnel, a first inclined edge and a second inclined edge and a narrow opening end;

a tube section connected to the narrow opening end, said tube section comprising a tube, said tube being ring-shaped and having a tube top opening and a tube bottom opening;

a scoop section comprising a scoop edge that defines the tube top opening, said scoop edge being semi-elliptical in shape; and a flat section connected to the scoop edge;

wherein the container section, the funnel section, the tube section, the scoop section, and the flat section are integrally formed into a single piece.

2. A device for pouring a liquid material onto an external surface comprising:

a container section comprising a cup container, said cup container comprising a hollow tube with a bottom edge and a top edge that defines a top opening, said top opening being sized and disposed to receive a cup, wherein a handle is attached to said container section, said handle having a flat parallelogram shape;

a funnel section connected to the top edge of the container section, said funnel section being bowl-shaped and comprising a funnel, a first inclined edge and a second inclined edge and a narrow opening end;

a rectangular prism shaped tube section connected to the narrow opening end, said rectangular prism shaped tube section comprising a rectangular prism shaped tube, said rectangular prism shaped tube having a rectangular prism top opening and a rectangular prism bottom opening;

a scoop section comprising a scoop edge that defines the rectangular prism top opening; and a flat section connected to the scoop edge;

wherein the container section, the funnel section, the prism funnel section, the scoop section, and the flat section are integrally formed into a single piece.

3. A device for pouring a liquid material onto an external surface comprising:

a container section comprising a cup container, said cup container comprising a hollow tube with a bottom edge and a top edge that defines a top opening, said top opening being sized and disposed to receive a cup, wherein a handle is attached to said container section, said handle having a flat parallelogram shape;

a funnel section connected to the top edge of the container section, said funnel section being bowl-shaped and comprising a funnel, a first inclined edge and a second inclined edge and a narrow opening end;

a triangular prism shaped tube section connected to the narrow opening end, said triangular prism shaped tube section comprising a triangular prism shaped tube, said triangular prism tube having a triangular top opening and a triangular bottom opening;

a v-scoop section comprising a v-shaped edge that defines the triangular top opening; and wherein the container section, the funnel section, the triangular prism section, and the v-scoop section are integrally formed into a single piece.

* * * * *